US011146612B1

(12) United States Patent
Pestryaev et al.

(10) Patent No.: US 11,146,612 B1
(45) Date of Patent: Oct. 12, 2021

(54) SYSTEM, DEVICE AND METHOD FOR STREAMING AND RECEIVING CONTENT IN REAL-TIME FROM WEARABLE CAMERAS WITH LATENCY CONTROL AND QUALITY OF CONTENT CONTROL

(71) Applicant: Motionray, Inc., Stamford, CT (US)

(72) Inventors: Alexander Pestryaev, Moscow (RU); Iurii Bussei, Khimki (RU)

(73) Assignee: MotionRay, Inc., Stamford, CT (US)

( * ) Notice: Subject to any disclaimer, the term of this patent is extended or adjusted under 35 U.S.C. 154(b) by 0 days.

(21) Appl. No.: 17/026,210

(22) Filed: Sep. 19, 2020

Related U.S. Application Data

(60) Provisional application No. 62/905,439, filed on Sep. 25, 2019.

(51) Int. Cl.
*H04L 29/06* (2006.01)
*H04L 12/861* (2013.01)

(52) U.S. Cl.
CPC ............ *H04L 65/80* (2013.01); *H04L 49/90* (2013.01); *H04L 65/607* (2013.01); *H04L 65/608* (2013.01)

(58) Field of Classification Search
CPC ........... H04L 65/80; H04L 65/607–608; H04L 49/90
See application file for complete search history.

(56) References Cited

U.S. PATENT DOCUMENTS

| | | | |
|---|---|---|---|
| 2015/0120768 A1* | 4/2015 | Wellen | H04N 21/4782 707/755 |
| 2015/0373075 A1* | 12/2015 | Perlman | H04L 65/608 709/217 |
| 2019/0215729 A1* | 7/2019 | Oyman | H04L 65/80 |

* cited by examiner

*Primary Examiner* — Kristie D Shingles
(74) *Attorney, Agent, or Firm* — Bardmesser Law Group

(57) ABSTRACT

Video streaming method, including establishing first link through first radio network between transponder and server via first base station, wherein transponder receives video data from camera; establishing second link through second radio network between transponder and server via second base station; generating video stream and sending to transponder; assigning sequence numbers to packets; transmitting video stream to server through first link as first stream, and through second link as duplicate second stream; on first sponge of first radio network, receiving radio data of first stream and sending it to server as third stream; on second sponge of second radio network, receiving radio data of second stream and sending it to server as fourth stream; on server, receiving first stream through first link and third stream from first sponge, and receiving second stream through second link and fourth stream from second sponge; discarding duplicate packets; combining packets into resultant stream.

16 Claims, 21 Drawing Sheets

SYSTEM, DEVICE AND METHOD FOR STREAMING AND RECEIVING CONTENT IN REAL-TIME FROM WEARABLE CAMERAS WITH LATENCY CONTROL AND QUALITY OF CONTENT CONTROL

BACKGROUND OF THE INVENTION

Field of the Invention

The present invention relates to wireless transferring of data, particularly, to transmit audio and video content in real time (less than 0.5 sec latency) based on algorithms that employ state-of-the-art wireless communication technologies, such as WI-FI/LTE/UWB/3G/5G, etc., as well as AI (artificial intelligence) in order to improve, stabilize, and recognize footage received; from wearable devices that can be mounted on headgear, e.g., helmets, baseball caps, hats; the devices comprising at least a camera (or several cameras), a microphone, at least two data transfer technologies, e.g. two modems with a single/different communication technologies (WI-FI+LTE, WI-FI+WI-FI, etc.), which enable multiple simultaneous connections for simultaneous data transfers, a BLUETOOTH earphone to communicate with the wearer, a CPU, a battery, etc.; and from stationary devices coupled with a wireless detachable transponder that contains at least two modems using a single technology (e.g., WI-FI+WI-FI) or different technologies (e.g. WI-FI+LTE), which enable multiple simultaneous connections for simultaneous data transfers; and receiving devices (of at least two types) for communication and gathering data from wearable devices.

Background of the Related Art

Many companies are striving to provide high-quality video and audio content in real time (less than 0.5 sec latency), while maintaining reasonable quality. The content is to be transmitted from multiple lightweight wearable devices that can be mounted on headgear or different elements of clothing, or from professional filming equipment, such as cameras, camcorders, etc. of various types, to which an external wireless transponder can be connected and which can be used in mass gatherings, and utilized in areas of mass activities (sports events, large enterprises, concerts, concerts, continuous video recording and Internet broadcasting of creative processes, such as music, painting, art, etc., in a studio or workshop via two or more wireless cameras for further commercial (paid) use in marketing or education), in on-the-job personnel training, or for personnel assistance through remote expert consultations, etc.)

Existing solutions have not yet overcome the major problems of collecting data from multiple devices, specifically:

(1) It is impossible to provide stable audio and video signal feed from wearable devices (without errors and break-offs) that can be mounted on headgear or integrated into headgear or different elements of clothing, or stationary filming equipment with a wireless transponder connected to it, to the target servers (a mobile TV studio, a production control room, the central server for Internet broadcasting, or CDN—content delivery network)). The more people are present in the work area and nearby, the higher the error and break-off rates. To offset this, image quality or audio quality has to be lowered and the number of wearable devices has to be cut, thus reducing the total data feed, and latency has to be increased to several seconds in order to enable recovery of lost content packets without interrupting the broadcast, which, in turn, precludes TV broadcasting of the content due to the 0.5 sec latency threshold.

(2) It is impossible to provide high-quality audio and video signal feed (without errors and of stable quality), when all wearable devices or stationary filming equipment with a wireless transponder connected to it are moved into the same work area. In this case, the total data feed has to be reduced, the aggregate content quality has to be lowered, or the bandwidth has to be yielded to just one device, thus sacrificing the signal quality of other devices.

(3) It is impossible to provide high-quality real-time (less than 0.5 sec latency) audio and video feed, when there are many people present. The losses of data exchange between wearable devices and servers (CDN, mobile TV stations, etc.) can be offset by increasing the latency (up to 3-4 secs), as shorter delays result in more difficulties in providing stable high-quality signal feed from wearable devices or stationary filming equipment with a wireless transponder connected to it to servers through recovery of lost data packets and an increased jitter buffer at destination (a mobile TV studio, a production control room, the central server for Internet broadcasting, or CDN—content delivery network).

(4) First-person broadcasting devices are usually unwieldy and cumbersome, which makes them difficult to be used by athletes, police officers, rescue or emergency workers, or enterprise personnel.

Therefore, there is the need in the art to improve the technologies of data transfer in crowded areas at high levels of radio channel noise, and to create a system that will be capable to provide stable audio and video signal feed of high quality in real time (less than 0.5 sec latency) simultaneously from all active wearable devices that can be mounted on or integrated into headgear or different elements of clothing, transferring audio and video data from their location to a server/fans/experts/remote support services (TV, CDN), or from devices (filming equipment) that can be coupled with an external transponder using a dedicated interface provided by the manufacturer, with no quality losses regardless of the device location within the work area, without serious break-offs/errors, while being quickly deployable on existing venues (sports arenas, concert venues, enterprises, public spaces), quickly replaceable, shockproof, lightweight and not expensive, embodied as wearable devices for headgear, such as helmets, baseball caps, etc., and keeping wearable devices quickly replaceable, as well as reasonably shockproof, lightweight, and inexpensive Conventional solutions all demonstrate considerable drawbacks when applied to mass gatherings, such as sports arenas, festivals, etc.

Conventional/known technical solutions are described in, e.g., U.S. Ser. No. 10/021,157B1, U.S. Pat. No. 9,648,064, US20160286891A1, US20090189981A1, U.S. Pat. No. 9,203,498B2. However, all of them have considerable drawbacks, one of which is using only one high-speed channel for transferring content from the wearable device to the access point (main server). A single high-speed data transfer channel for exchanging data with the server (i.e. receiving device or target server that receives the camera feed) will be insufficient for continuous transfer of content to the server (here: access point) because of collisions that may happen during data transfer at mass gatherings (crowded areas), such as sports arenas, due to fast movement of people/athletes within the work area and handovers between base stations, interference either between people or between the camera equipped with a transmitter and other objects, dead spots, where signals fade leading to data losses, which, in turn, requires higher latency in order to offset the fading and losses. Another drawback is that conventional solutions do not disclose what methods have to be used.

Conventional data exchange solutions involving wearable devices that can be mounted on or integrated into headgear or different elements of clothing, or stationary filming equipment, to which a wireless transponder can be connected, used at mass gatherings and employing standard data transmission/reception methods via a single transceiver, preclude stable reception of data streams from multiple cameras without break-offs or increased latency, due to handovers and data losses. The data stream may be received by a single receiving device only, which may lead to increased latency, as well as data losses or collisions. Also, a single receiving device does not provide a data stream that is enough to produce a resulting stream to be broadcast via TV/CDN/etc. Thus, there is a need for distributed data reception from a single camera, so that the server receives several streams containing the same data (i.e. one base station has got 100% of the traffic, another one has got 90% of the traffic, another one has got 50% of the traffic, etc.), which would allow to produce a resulting stream out of multiple streams from several receiving devices. In this case, if one receiving device loses some data, another receiving device will be able to offset this loss. Another safeguard is using two or more wireless access technologies, particularly, two modems both of which transfer 100% of the original traffic (or, in the case of three technologies, two are used to transfer 100% of the traffic each, while the third technology is used exclusively for feedback or control data transmission) and two independent systems with distributed reception to accumulate data as described above. Thus, with distributed data reception and repeated transmission of the same data via different communication channels, it is possible to maintain a minimum latency that does not exceed 0.5 sec and transfer data from multiple cameras regardless of their locations within or around the work area.

Also, a single channel will be insufficient to continuously provide high-quality content when multiple wearable devices, or stationary filming equipment with a wireless transponder connected to it, transmit important content simultaneously from the same part of the work area. Therefore, network load distribution is necessary, i.e., it is necessary to use multiple modems operating in different networks with different radio access technologies at once.

Another major drawback is that the above publications do not teach how to transfer/receive data during mass activities, such as sports events, mass demonstrations, nor how to continuously provide for low latency and high quality of video feed when multiple wearable devices operate in the work area. The above patents mention operating using standard WI-FI/WI-MAX/5G, etc. channels; however, the main problem with standard channels is that people/viewers participating in mass activities use the same standard channels to access WI-FI hotspots with their tablets, smartphones, etc. Thus, if the system operates using standard channels, then the hotspots (access points) may be busy processing signals from "outside" devices and, therefore, unable to process the data transferred from wearable devices.

U.S. Pat. No. 9,203,498B2 discloses a technology that has a number of drawbacks. Particularly, the first one is that it requires a "transponder" to be connected to a camera in order to pass the data through a remote server to the TV studio using conventional technologies, such as LTE, 5G, Ethernet, WI-FI. Despite creating an artificial abundance of content, inevitable loss of data would have to be recovered from the remote server, which causes uncontrollably increased latency. The second drawback is that if it is necessary to accumulate data from wireless cameras at the arena and pass them over to a mobile TV studio at the same arena, then the accumulated data, in case they are transmitted through a communications provider to a remote server, have to be passed back to the arena, which would increase latency; besides, the data would arrive at the arena with a delay, thus preventing them from being used in real time and add AR elements. The third drawback is that if the public data channel (3G/LTE/5G/WI-FI) of the communications provider experiences increased load, the data stream generated by a camera has to be compressed, which results in deteriorated image quality.

Distributed data transfer technologies are unable to maintain stable image quality for multiple cameras both around and within the work area, along with minimum latency. In this case, it would be necessary to provide distributed reception of data by several receiving devices (of several types) located both around and within the work area using a proprietary/modified/combined wireless technology that allows 100% of the data to be passed over several data channels to the server located at the arena, and further to the feed control panel at the arena, a mobile TV studio, screens located at the arena, etc.

The above publications mainly disclose systems of video cameras (i.e., wearable devices) with transmitters that are configured to transmit video feed to the access point(s) only when the data transfer channel is free. However, such systems cannot be considered systems for gathering data from wearable devices with (audio and video or other types) output quality control, minimum latency (less than 0.5 sec) and continuous operation, which can also be mounted around the work area.

SUMMARY OF THE INVENTION

The invention relates to a method and system for transmitting video and audio data.

In one aspect, there is provided a method for streaming video content, including establishing a first link for streaming data through a first radio network between a remote transponder and a server via a first base station, wherein the transponder receives video data from a camera; establishing a second link for streaming data through a second radio network between the remote transponder and the server via a second base station; on the camera, generating a video stream and sending the video stream to the transponder; assigning a packet sequence number to each packet in the video stream; transmitting the video stream from the transponder to the server through the first link as a first stream, and through the second link as a second stream, wherein the second stream duplicates the first stream; on a first sponge that corresponds to the first radio network, receiving radio data that represents the first stream and sending it to the server as a third stream; on a second sponge that corresponds to the second radio network, receiving radio data that represents the second stream and sending it to the server as a fourth stream; on the server, receiving the first stream through the first link and the third stream from the first sponge; on the server, receiving the second stream through the second link and the fourth stream from the second sponge; for each packet in each stream, identifying packets by their sequence number, retaining a first received packet with a particular sequence number, and discarding all remaining packets with the same sequence number; and combining the retained packets into a resultant video stream.

As a further option, the method includes, on the camera, generating an audio stream and sending the audio stream to the transponder; assigning a packet sequence number to each packet in the audio stream; transmitting the audio stream from the transponder to the server through the first link as a fifth stream, and through the second link as a sixth stream, wherein the sixth stream duplicates the fifth stream; on the first sponge, receiving radio data that represents the fifth stream and sending it to the server as a seventh stream; on the second sponge, receiving radio data that represents the sixth stream and sending it to the server as an eighth stream; on the server, receiving the fifth stream through the first link and the seventh stream from the first sponge; on the server, receiving the sixth stream through the second link and the eighth stream from the second sponge; for each packet in each stream, identifying packets by their sequence number, retaining a first received packet with a particular sequence number, and discarding all remaining packets with the same sequence number; and combining the retained packets of the audio stream into a resultant audio stream and combining the resultant audio stream with the resultant video stream.

As a further option, the transponder assigns timestamps to the audio and video packets, and wherein the server synchronizes the resultant audio stream and the resultant video stream using the timestamps. As a further option, the server transmits the resultant video stream to end users. As a further option, the sponge scans a radio environment and informs the server about which channels are available for transmission of the video stream and the audio stream. As a further option, the first radio network is any of UWB, 3G mobile telephone network, LTE mobile telephone network, 5G mobile telephone network and WI-FI network. As a further option, the second radio network is a WI-FI network. As a further option, the WI-FI network is modified to (a) block confirmation of receipt of the packets, and/or (b) to operate on non-standard bands so as to only see its own cameras/transponders. As a further option, the server stabilizes the resultant video stream to remove shaking artefacts. As a further option, the server receives video and audio streams from multiple cameras, wherein each camera has its own transponder, and wherein all transponders use the first and second radio networks. As a further option, the first link includes a first modem that is associated with the first base station, the second link includes a second modem that is associated with the second base station. As a further option, the first and second sponges are physical devices that monitor traffic to the first and second base stations. As a further option, the transponder is a physical device. As a further option, the transponder is a virtual device.

As a further option, the method includes on the server, when any packet is lost, sending a request from the server to the transponder through the first radio network via the first base station and sending the same request through the second radio network via the second base station to retrieve the lost packet; on the transponder, upon receiving the request, searching a sending buffer queue for the lost packet by its sequence number; on the transponder, if the lost packet is found in the sending buffer queue, transferring the found packet to a position in a sending buffer queue to be sent before any other packet in the sending buffer queue; on the server, if the lost packet is received, moving the packet to a position in a receiving buffer queue between a packet with a preceding sequence number and a packet with a succeeding sequence number; on the server, if the lost packet is not received but is still within a latency defined by the server, sending another request to the transponder to retrieve the lost packet; on the server, if the lost packet is not received and the latency has been exceeded, searching the receiving buffer queue for packets marked as keyframe-related packets; on the server, if any keyframe-related packets are detected in the receiving buffer and the lost packet is not a keyframe-related packet, removing all packets from the beginning of the receiving buffer queue to a first keyframe-related packet, excluding the first keyframe-related packet, wherein a first keyframe-related packet is one closest to a beginning of the receiving buffer queue; on the server, if no keyframe-related packets detected in the receiving buffer or if the lost packet is a keyframe-related packet, removing all packets in the receiving buffer queue and sending a keyframe generation request to the transponder; and wherein all packets received by the server after the keyframe generation request is sent which are not a first packet of a keyframe are dropped before the first packet of the keyframe is received.

As a further option, the method includes on the transponder, when the keyframe generation request from the server is received, searching the sending buffer queue for a first keyframe-related packet, wherein the first keyframe-related packet is one closest to a beginning of the sending buffer queue; on the transponder, if the first keyframe-related packet is detected in the sending buffer and is within the latency, removing all packets from the beginning of the sending buffer queue to the first keyframe-related packet, excluding the first keyframe-related packet; on the transponder, if the first keyframe-related packet is not detected in the sending buffer queue or the latency is exceeded, searching an encoding buffer queue for a keyframe which is within the latency, and wherein if there are more than one qualified keyframe, the first keyframe is used, and wherein the first keyframe is one closest to a beginning of the encoding buffer queue; on the transponder, if the keyframe is found in the encoding buffer queue, removing all frames between the keyframe and the beginning of the encoding buffer queue; and on the transponder, if the keyframe is not found in the encoding buffer queue, removing all frames in the encoding buffer queue, and generating a new keyframe.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The technology, devices, and system disclosed herein can be used to transfer data, particularly, to broadcast audio and video content in real time (less than 0.5 sec latency) based on algorithms that employ state-of-the-art wireless communication technologies, such as WI-FI/LTE/UWB/3G/5G, etc., as well as AI (artificial intelligence) in order to improve, stabilize, and recognize footage received; from wearable devices that can be mounted on headgear, e.g., helmets, baseball caps, hats; the devices comprising at least a camera (or several cameras), a microphone, at least two data transfer technologies, e.g. two modems with a single/different communication technologies (WI-FI+LTE, WI-FI+WI-FI, etc.), which enable multiple simultaneous connections for simultaneous data transfers, a BLUETOOTH earphone to communicate with the wearer, a CPU, a battery, etc.; and access points (of at least two types) for communication and gathering data from wearable devices, and from stationary devices coupled with a wireless detachable transponder that contains at least two modems using a single technology (e.g., WI-FI+WI-FI) or different technologies (e.g. WI-FI+LTE), which enable multiple simultaneous connections for simultaneous data transfers.

The present invention can be used in crowded areas (sports events, enterprise security, social gathering security, entertainments, such as carting, paintball, cycling, polo, reality shows, concerts, continuous video recording and Internet broadcasting of creative processes, such as music, painting, art, etc., in a studio or workshop via two or more wireless cameras for further commercial (paid) use in marketing or education), in on-the-job personnel training, or for personnel assistance through remote expert consultations). Please note that the specific purpose of the solution disclosed herein is to enable the gathering and broadcasting of audio and video content in real time (less than 0.5 sec latency) during mass activities (at mass gatherings, enterprise employees, security officers at various events) from multiple wearable devices that are operating simultaneously and broadcasting audio and video content with stable quality despite their relative location inside the work area, and transferring data simultaneously over several concurrent wireless data transfer channels (provided by modems integrated into wearable devices), where the content is received by access points (of at least two types) to be forwarded to the main server for processing, where the content may undergo further processing by a dedicated AI in order to improve the image (increase the framerate, enhance and stabilize the image), and, possibly, to recognize objects, faces, or emotions; then, the content may be broadcast from the main server to the users (CDN, TV, etc.).

Figure 1A:
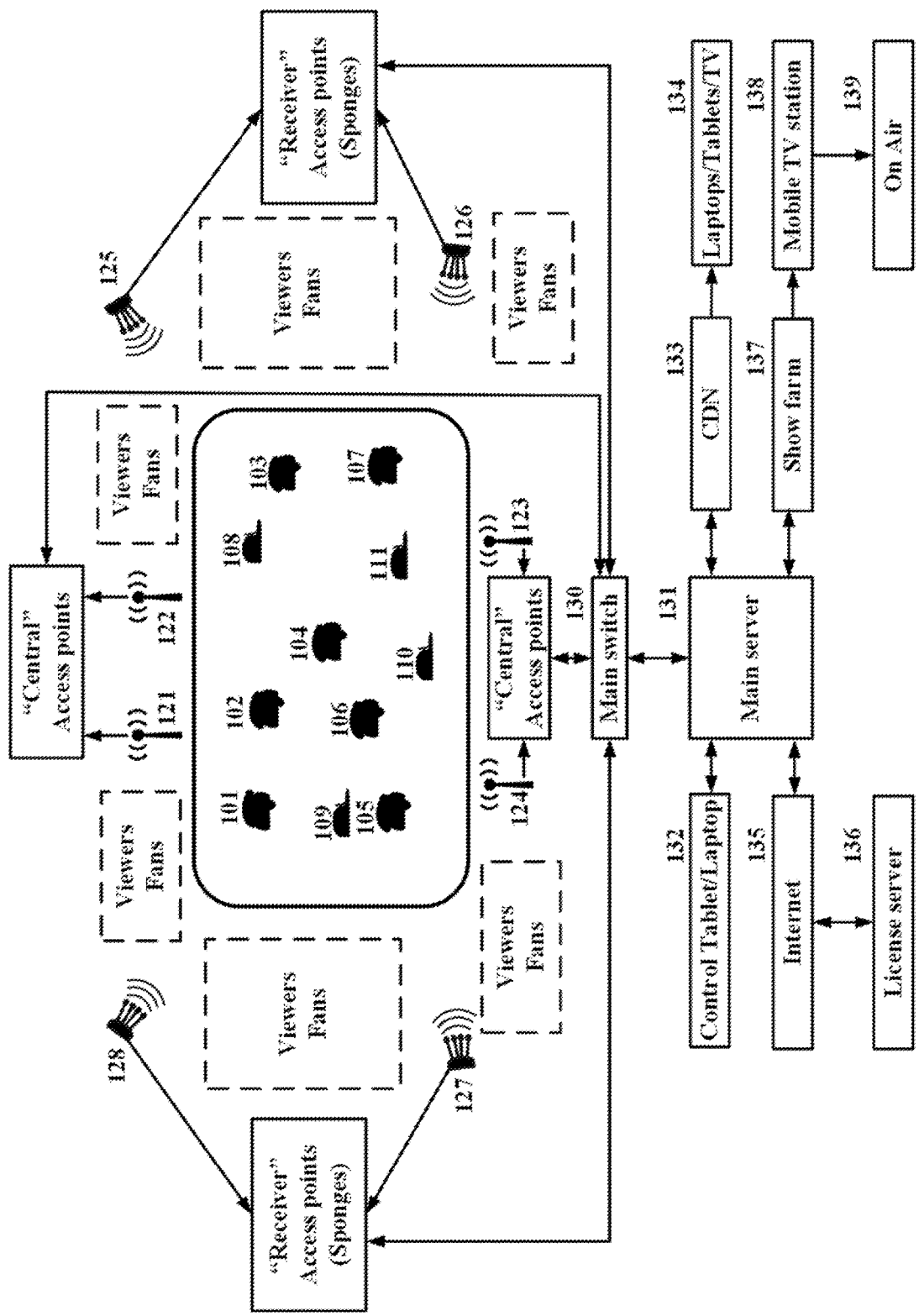
FIG. 1A illustrates an exemplary deployment of the present system on a sports arena.

FIG. 1A illustrates an exemplary deployment of the present system on a sports arena. Other venues may require different deployments. In this example, FIG. 1A illustrates a venue—a sports arena—during a game, where the system for capturing audio and video content from helmets 101-107 and caps 108-111 is deployed (here: football helmets and judges' caps, though wearable devices are not limited to these). The arena is surrounded by access points of two types: "central" access points 121-124 that communicate with wearable devices mounted on helmets and caps 101-111 wirelessly to control them and receive audio and video data from them, and "sponge" receivers 125-128 for additional reception of data from wearable devices 101-111, as well as for analyzing the radio spectrum (channels). In the figure, a closed-circuit system is shown that uses dedicated access points (based on patched standard Wi-Fi) 121-124 and 125-128, but other access points can be used as well, such as public ones (WI-FI) or provided by communications providers (LTE, 5G).

Instead of four "central" access points 121-124 and "sponge" receivers 125-128, shown in the figure, there may be less or more of them, depending on the number of wearable devices 110-111 used and radio access technologies employed. The work area doesn't have to contain exactly ten wearable devices 101-111, there may be less (at least one) or more of them. "Central" access points 121-124 and "sponge" receivers 125-128 are connected to the main switch 130 via a wired LAN, which, in turn, is connected to the main server 131 in the same fashion. The main server 131 controls wearable devices 101-111 by means of "central" access points 121-124 via radio interfaces.

Control tablet/laptop 132, license server 136, show farm 137, and CDN (Content Delivery Network) 133 are connected to the main server 131. The license server 136 is connected to the present system over the Internet 135 to enable remote control of the system. The show farm 137 may be connected to a mobile TV station 138 via a coaxial cable, and the mobile TV station 138 broadcasts audio and video signals it receives on air 139. CDN sends audio and video data it receives to laptops, tablets, TVs 134 over the Internet.

Figure 1B:
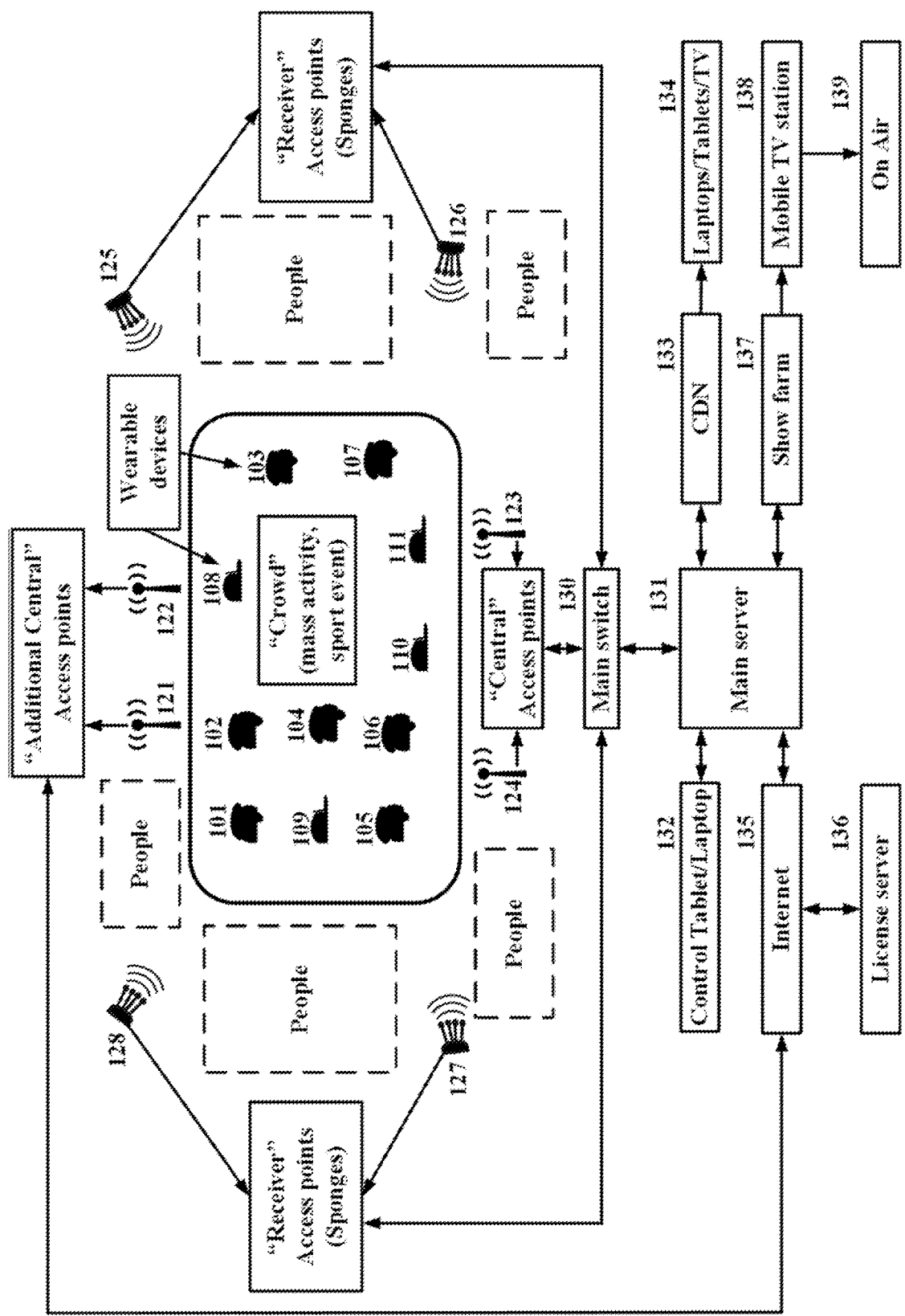
FIG. 1B illustrates an exemplary deployment of the present system on a sports arena using provided (rented) access points, either public or dedicated ones, and personal (designed) ones.

FIG. 1B illustrates an exemplary deployment of the present system a mass activity venue (sports arena, enterprise, concert venue, etc.) using provided (rented) access points, either public or dedicated ones. Other venues may require different deployments. In this example, FIG. 1B illustrates a mass activity venue, where the system for capturing audio and video content from helmets 101-107 and caps 108-111 is deployed (here, they may be police helmets and caps, player helmets and caps, or maintenance workers' headgear, etc., though wearable devices are not limited to these). The arena is surrounded by access points of three types: a) "central" access points 121, 122, either provided by communications providers or public ones (e.g., WI-FI/LTE/5G); b) "central" access points 123, 124 that are personal (designed) and is represented by patched standard WI-FI; and c) "sponge" receivers 125-128 for additional reception of data from wearable devices 101-111, as well as for analyzing the radio spectrum (channels).

Receivers may employ several radio access technologies that are used by the "central" access points, as well as only one of them, or all at once, depending on the number of wireless modems that are built into the receivers 125-128. "Central" access points 121-124, have bidirectional wireless connection to wearable devices mounted on helmets and caps 101-111 in order to control them and receive audio and video feeds from them, while receivers 125-128 have unidirectional connection and are used for additional collection of data from wearable devices 101-111 only, by communications providers to various services involved in the event. In the figure, the system shown is not closed-circuit, using personal (designed) access points 123-128 and other access points 121, 122 either public ones or leased to the police by communications providers, although different system deployments are also possible.

Instead of four "central" access points 121-124 and "sponge" receivers 125-128, shown in the figure, there may be less or more of them, depending on the number of wearable devices 110-111 used and radio access technologies employed. The work area doesn't have to contain exactly ten wearable devices 101-111, there may be fewer (at least one) or more of them.

"Central" access points 123, 124 and "sponge" receivers 125-128 are connected to the main switch 130 via a wired LAN, which, in turn, is connected to the main server 131 in the same fashion. "Central" access points 121, 122 are connected to the main server 131 via WAN/Internet 135. The main server 131 controls wearable devices 101-111 by means of "central" access points 121-124 via radio interfaces. Control tablet/laptop 132, license server 136, show farm 137, and CDN (Content Delivery Network) 133 are connected to the main server 131. The license server 136 is connected to the present system over the Internet 135 to enable remote control of the system. The show farm 137 may be connected to a mobile TV station 138 via a coaxial cable, and the mobile TV station 138 broadcasts audio and video signals it receives on air 139. CDN sends audio and video data it receives to laptops, tablets, TVs 134 over the Internet.

Figure 4:
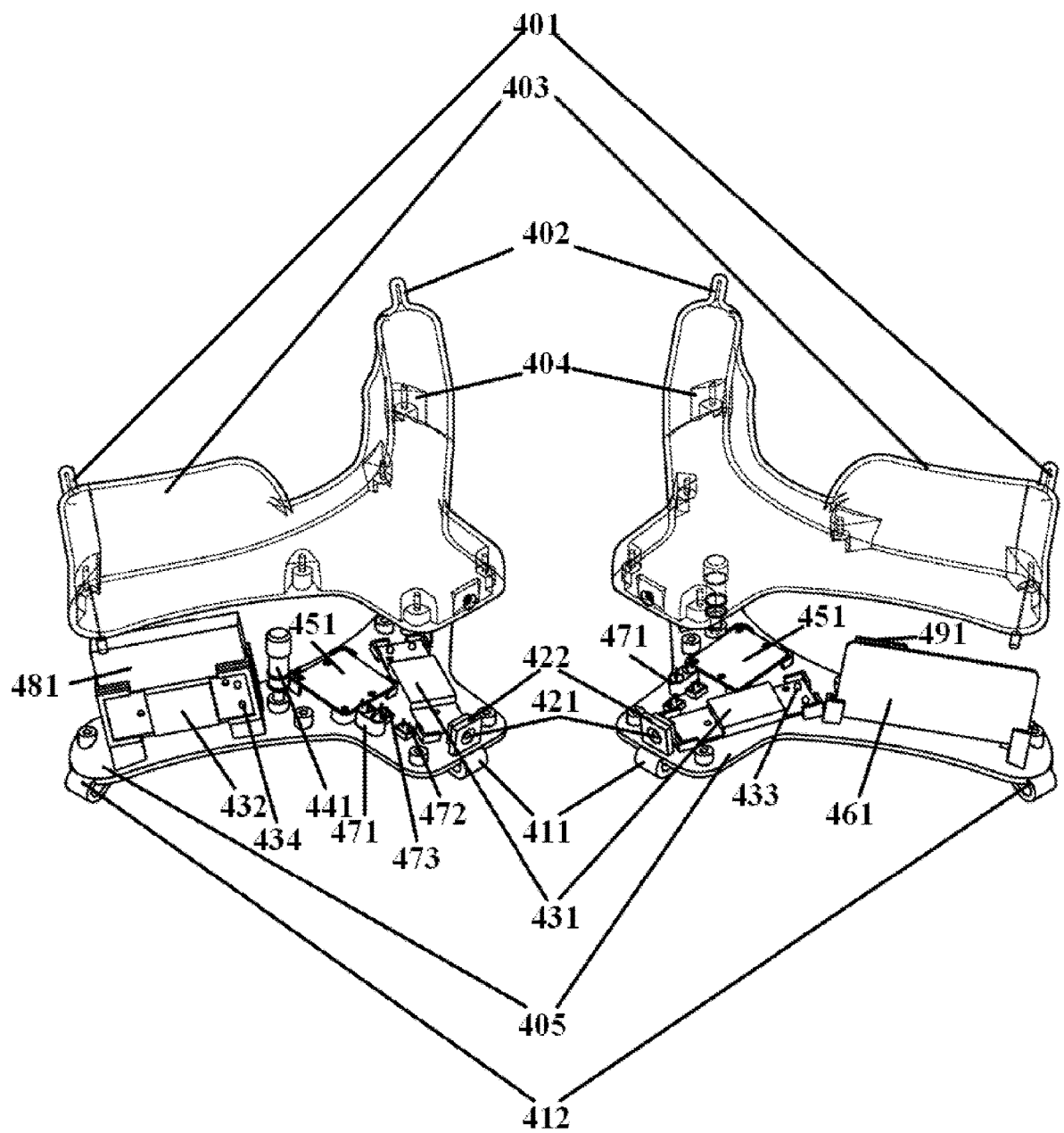
FIG. 4 shows two side views of an exemplary wearable device with cap clasps that may be mounted on the peak of a baseball cap and used in the system as illustrated by FIGS. 1A and 1B.
Figure 5:
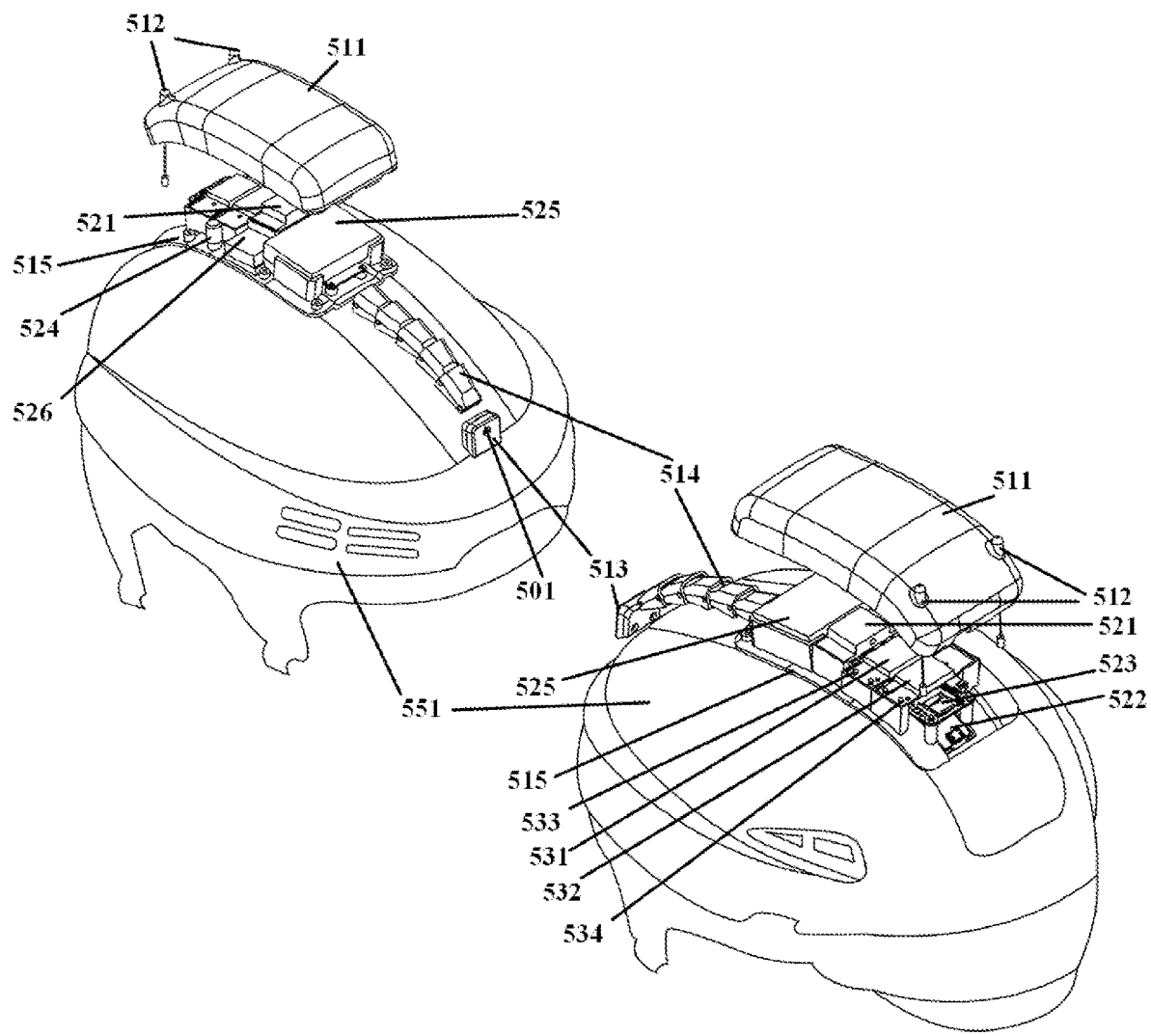
FIG. 5 shows the top view and two side views of an exemplary universal wearable device for a helmet that may be used in the games of hockey or lacrosse.
Figure 6:
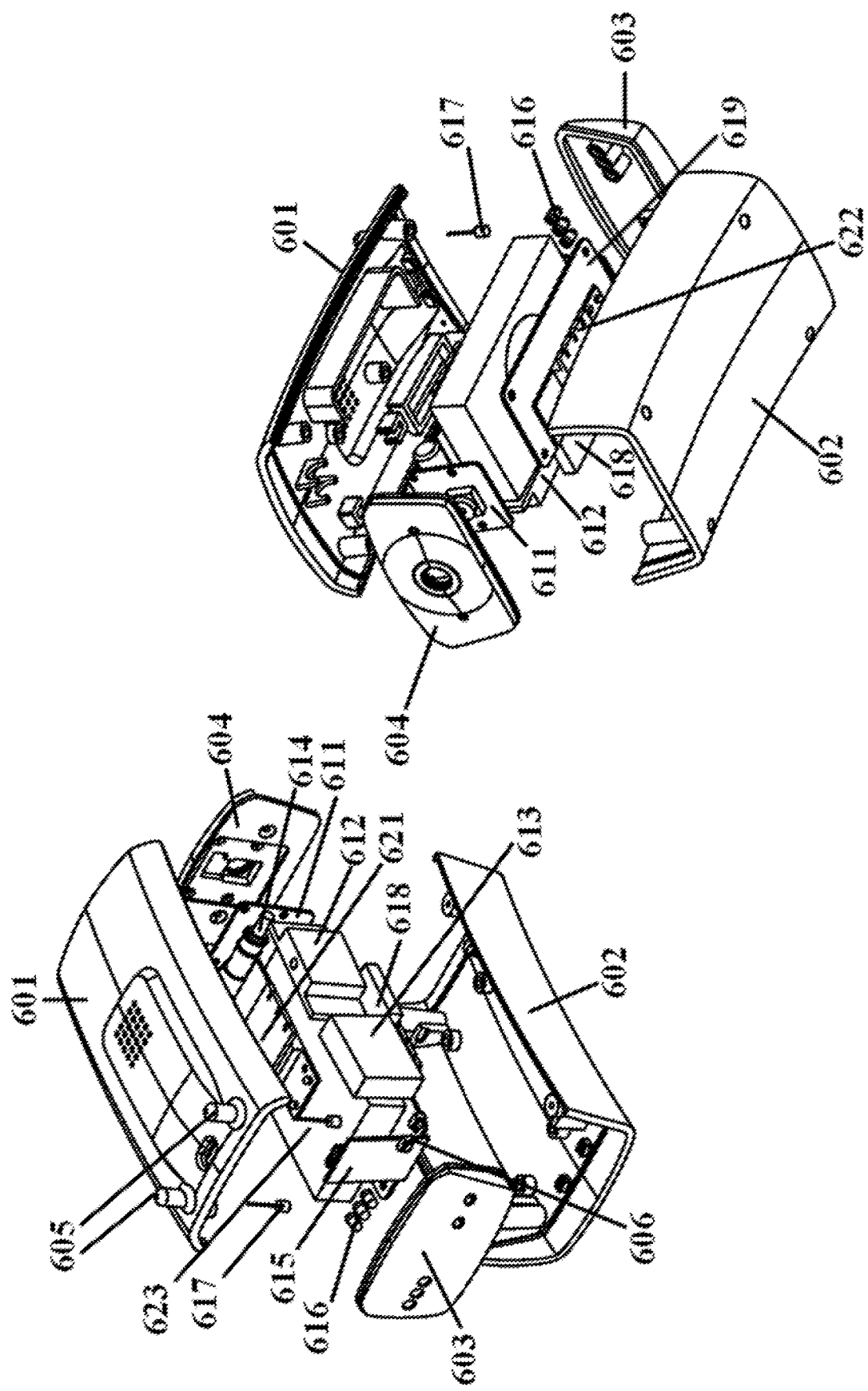
FIG. 6 shows the top and bottom views of an exemplary universal wearable device for a helmet having rounded surface without large holes on top that could be used to mount the device.

FIGS. 4, 5, and 6 illustrate exemplary wearable devices that can be mounted on headgear.

FIG. 4 shows two side views of an exemplary wearable device with cap clasps that may be mounted on the peak of a baseball cap (or other caps) and used in the system as illustrated by FIGS. 1A and 1B. In other words, FIG. 4 illustrates an exemplary wearable device that can be mounted on the cap peak. The device body 403, 405 can be made of plastic or other materials by means of 3D printing or pressure casting; the body has to be strong enough to protect internal components from shocks. This device can be fastened to the cap peak with special clasps 411, 412, wherein the clasps may have special bolts or prongs for stronger fixing. The heaviest main components, such as a battery 481, a CPU card 461, a DC-to-DC converter 491, one transceiver 432, a mic 441, and a camera unit 451, are positioned as closely to the head as possible, so that the main weight of the wearable device is felt less by the wearer and doesn't cause discomfort during use.

The lower part 403 and upper part 405 of the device body can be fastened together with connector bolts or some kind of clasps 404. The camera sensor 421 is protracted as much as possible to provide for best first-person image capture and is affixed to a mount 422. Inside the device body there are two modems 431 and 432 for transferring audio and video data and controlling the device. The device can be started and reset with the buttons 472, 473; it uses LED indicators 471. To enhance radio signal quality, external antennas 401 can be used.

FIG. 5 shows the top view and two side views of an exemplary universal wearable device for a helmet that may be used in the games of hockey or lacrosse. This wearable device may be used in the system as illustrated by FIGS. 1A and 1B. Thus, the example in FIG. 5 illustrates an exemplary universal wearable device that can be mounted on a helmet. The device body 511, 513-515 can be made of plastic or other materials by means of 3D printing or pressure casting; the body has to be strong enough to protect internal components from shocks. The device body can be fastened to the upper rim of the helmet 551 with special spreaders, adhesive tape, or a special ring.

The mounting universality is achieved by means of a special channel 514 that is designed as a "lobster tail", which can be adapted to almost any helmet type. The heaviest main components, such as a battery 525, a CPU card 523, a DC-to-DC converter 523, transceivers 531 and 532, a mic 524, a camera unit 521, and a charger 522 are positioned as closely to the helmet's center of gravity as possible, so that the main weight of the wearable device is felt less by the wearer and doesn't cause discomfort during use. The lower part 515 and upper part 511 of the helmet body can be fastened together with connector bolts or some kind of clasps. The camera sensor 501 is protracted as much as possible to provide for best first-person image capture and is put inside a special shockproof case 513 that can be made of aluminum or any other material capable of surviving a hit of a ball or a hockey puck. To enhance radio signal quality, external antennas 512 can be used.

FIG. 6 shows the top and bottom views of an exemplary universal wearable device for a helmet having rounded surface without large holes on top that could be used to mount the device. This wearable device may be used in the system as illustrated by FIGS. 1A and 1B. Thus, FIG. 6 illustrates an exemplary universal wearable device (in a single body) that can be mounted on a helmet. The device body 601-604 can be made of plastic or other materials by means of 3D printing or pressure casting; the body has to be strong enough to protect internal components from shocks. The main device body can be fastened to the upper rim of the helmet with special bolts, adhesive tape, a flexible belt, or a special ring.

The mounting universality is achieved by the device's compactness and slight curvature, which makes it possible to mount the device on almost any helmet (having smooth and rounded surface on its top). All components, including a battery 623, a CPU card 619, a DC-to-DC converter 612, transceivers 621 and 622, a mic 614, a charger 615, a USB hub 613, LED indicators 616, start and reset buttons 606, and antennas 617 are positioned as closely to the helmet's center of gravity as possible, so that the main weight of the wearable device is felt less by the wearer and doesn't cause discomfort during use. The lower part 602 and upper part 601 of the helmet body can be fastened together with connector bolts or some kind of clasps, provided that side parts 603 and 604 are mounted first. To enhance radio signal quality, external antennas 605, 617 can be used.

Figure 10:
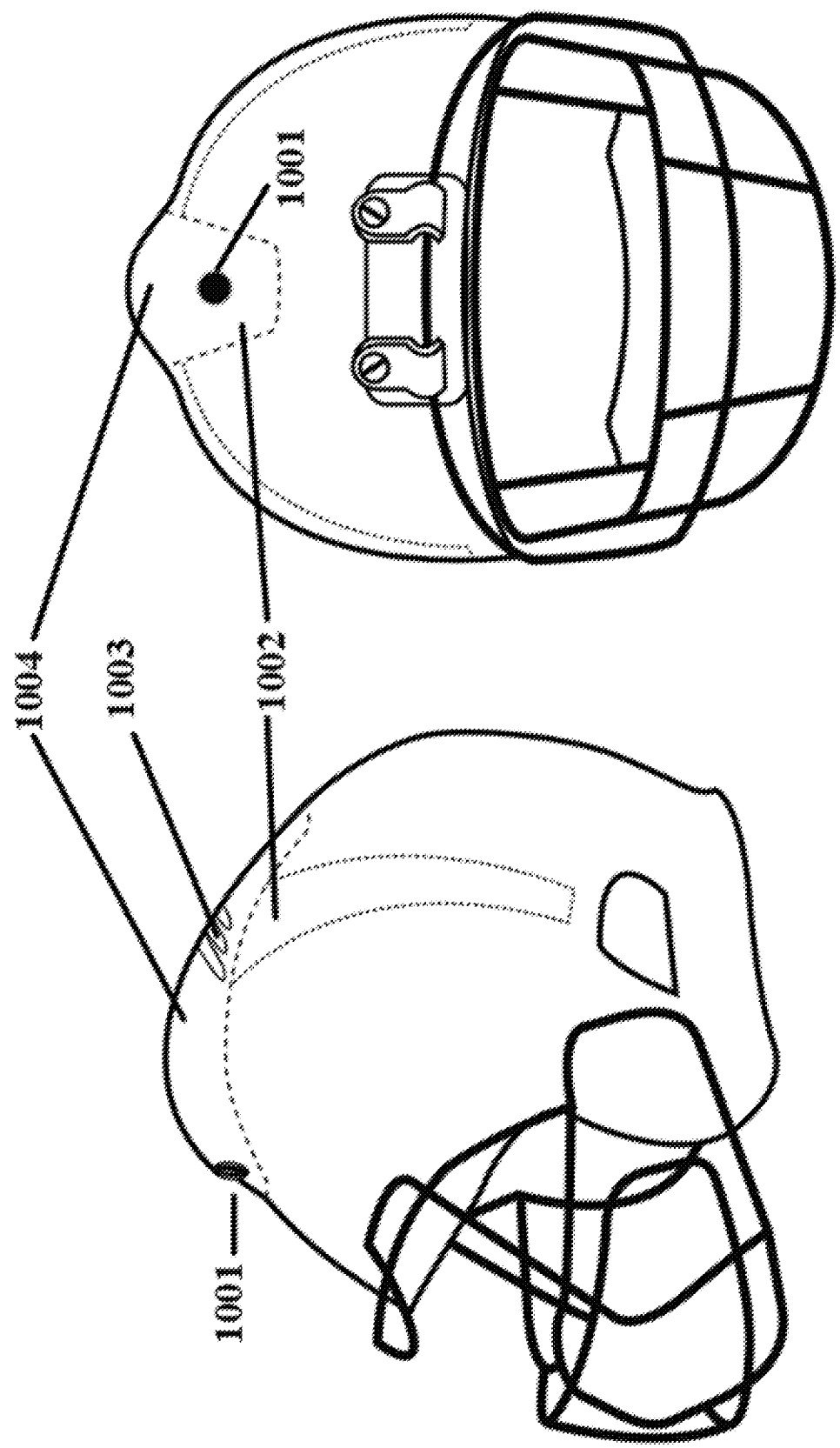
FIG. 10 shows the front and side views of an exemplary wearable device that is built into the detachable topmost layer of a helmet, which is designed like a fin.

FIGS. 4-6 illustrate exemplary wearable devices 101-111, which have to be lightweight (less than 250 g), so that the wearer doesn't feel their weight, and portable, i.e., mountable, e.g., on a helmet, so that they are easily replaced. In some embodiments, the wearable device may be already built into a helmet (see FIG. 10), wherein it is designed as a band 1004, or as a separate detachable layer 1002 (this layer can be removed/detached either automatically or manually in case of fire or any other accident, or in order to replace the device).

All the components of the device as a separate layer have to be integrated in order to reduce the weight of the layer itself and the entire helmet. The camera sensor has to be located in the front tip of the fin 1001, while air vents 1003 provide cooling for the device and radio transparency that is required by the modems. In another exemplary embodiment, the wearable device is designed as a band 1102 that is built in the uppermost layer of the helmet; otherwise, it can be mounted on the helmet, or it may skirt the back and sides of the helmet (see FIG. 11). All the components of the device are distributed inside the band, so that their weight is equally distributed along the entire band and is not felt by the wearer.

Figure 11:
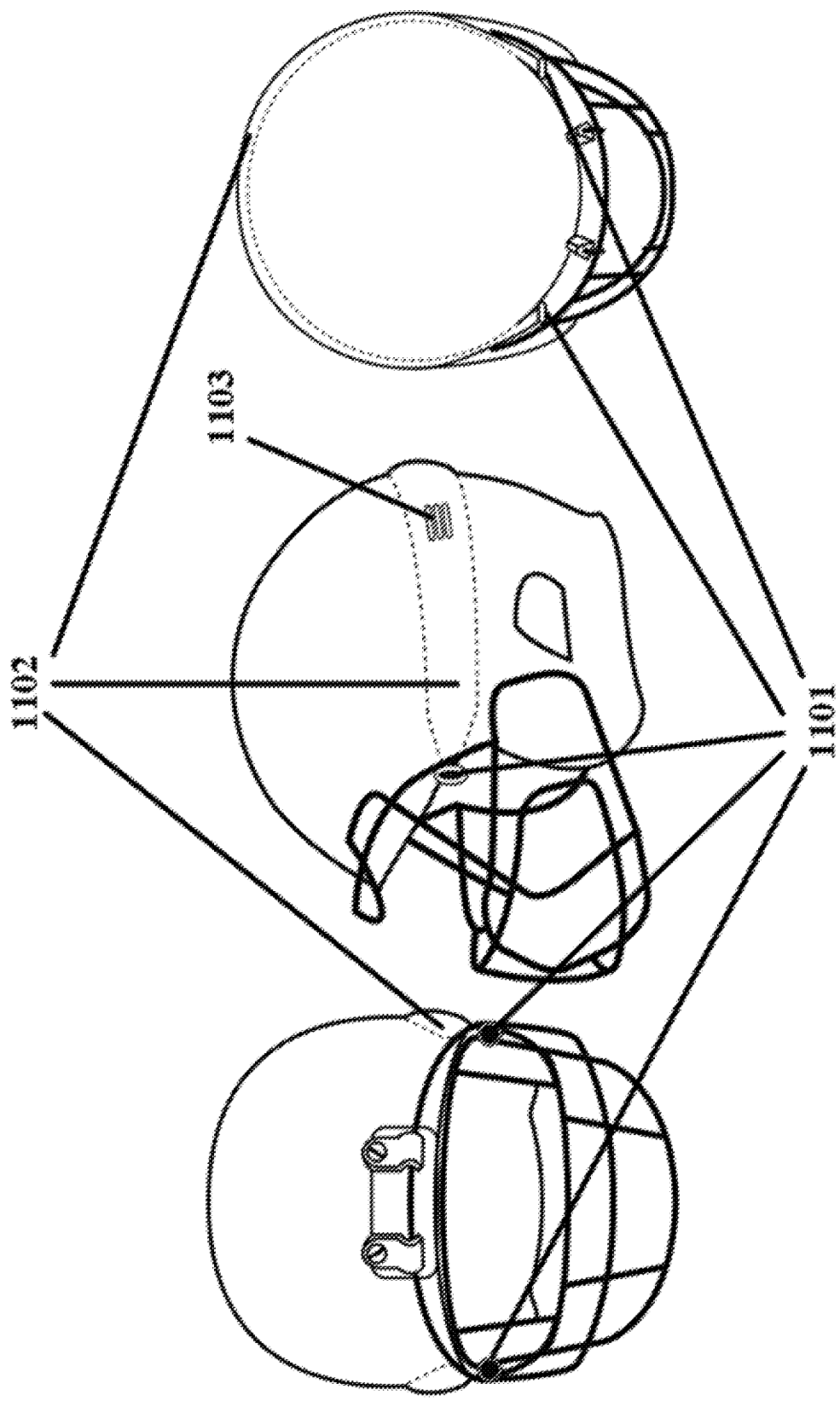
FIG. 11 shows the front, side and top views of an exemplary wearable device containing two cameras, that is built into the detachable topmost layer of a helmet, which is designed as a band that skirts the back and sides of the helmet.
Figure 12:
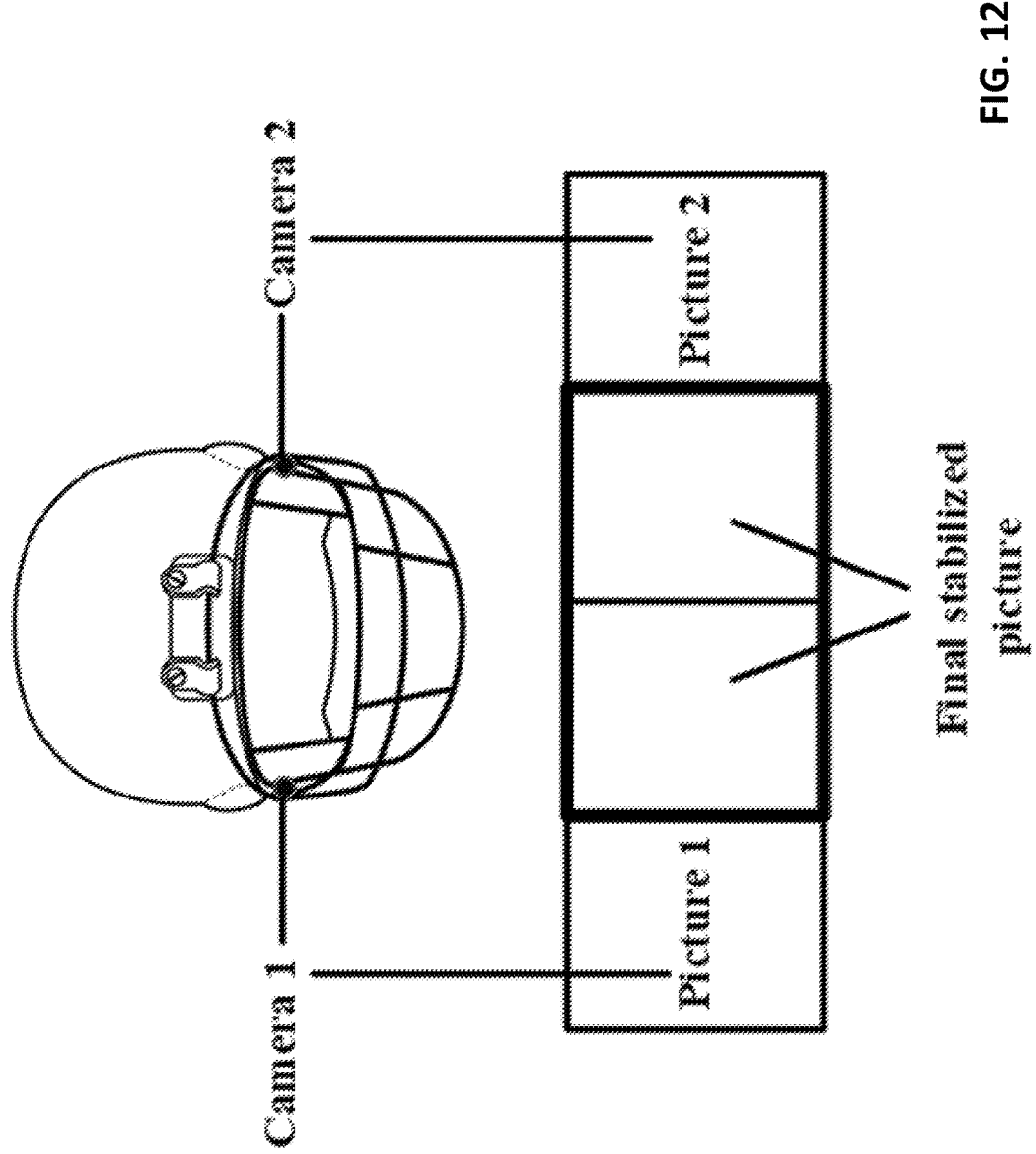
FIG. 12 illustrates an exemplary way of processing images that have been received from two cameras integrated into the wearable device that is mounted on a helmet or built into its topmost layer, so that the resulting image is horizontally stabilized.

According to the embodiment shown in FIG. 11, two cameras 1101 are used (to imitate the eyes), which are positioned on the wearer's eye level or at a small distance from it. Air vents 1103 provide cooling for the device and radio transparency that is required by the modems. By using two cameras, it is possible to capture and generate 3D video stream, either getting a wider field of view (up to 240°) or cropping both images and combining them into one. With two cameras, it is possible to obtain a wide-screen video stream, which allows to horizontally stabilize the image, based on the captured footage and sliding the frame along the combined image (see FIG. 12). Three cameras may be used, wherein two cameras are mounted near the eyes (see FIG. 11), and the additional third camera is mounted on the back of the head, which allows to obtain 360-degree video. In some embodiments of wearable devices 101-111, there may be two cameras (each covering a 180-degree area), which are mounted in the front and in the back, correspondingly, to obtain 360-degree video. More cameras, e.g., four (two above and two below), can also be used to generate a large four-part image, along which the sliding frame can be moved to stabilize the image both horizontally and vertically.

Wearable devices designed as bands (fins) (see FIGS. 10 and 11) can be used in a variety of helmets, such as helmets for football, hockey, lacrosse, as well as police or army helmets. If the cameras and other components are built into the helmet itself (its body or middle layer), so that there are no bumps outside, it will be necessary to add more holes, such as cooling vents, holes for radio transparency, a camera sensor, a mic and a charging device. All these holes on the helmet surface make it less durable, and in case of fire or smoke, the entire helmet has to be removed, which may be dangerous for the wearer. If the wearable device is designed as a separate layer that is "put on" the helmet, and all the components are distributed inside the layer, so that there are no bumps outside, it will make the layer—and the helmet— heavier, causing discomfort to the wearer. Also, this layer will need additional holes, such as cooling vents, holes for radio transparency, a camera sensor, a mic and a charging device. All these holes on the layer surface make it less durable. If the wearable device is mounted on the helmet or as an additional upper layer of the helmet, which can be detached, either automatically or manually, wherein all the components are brought together in a band, it will be easier to remove, and the helmet will always protect the wearer from any accidents.

Also, a wearable device integrated into the helmet (either as a middle layer, or the upper layer, wherein the components are distributed inside the helmet) will be heavier due to additional framework and increased size (volume and weight) of the helmet, than a device that is mounted separately or is put on top of the helmet as a fin (will all the components combined) or band. In competitions, where athletes use the strength of their own bodies to move, even a little extra weight can cause discomfort. The same applies to police or security officers or employees of other enterprises using wearable devices.

The CPU card (motherboard) 461, 523, 619 may include SoC with the ARM Cortex-A/M or Intel atom, etc. CPU to provide all necessary functions, such as supporting all the device components, processing the captured audio/video, and transmitting it via wireless modems, while being small enough to be placed inside the device body. The motherboard may also have one or more wired or wireless modems to transfer audio and video data.

The image sensor 421, 501, 611 (CMOS image sensor) may be represented by a digital 8-megapixel sensor (camera) that is capable of providing 4K image (3840×2160 pixels). Also, the camera may support the framerate of up to 90 frames per second to generate slow motion video, which is sought for both in sports and security. In case the wearable device or camera cannot be used or does not support the necessary framerate, the video may be resampled or recalculated by the AI on the show farm 137. Different digital sensors 421, 501, 611 can be used as well to capture the video (2-megapixel, 4-megapixel, 16-megapixel ones, etc.), with various configurations, supporting framerates from 1 frame per several seconds to 240 frames per second and resolutions of 720i/p, 1080i/p, 4K, etc.; generating footage (video stream) in various formats (RGB24/32, YCbCr 420/422/444, etc.); and having various settings, such as white balance, color depth, shutter speed, etc.

Digital sensors may comprise several components (see FIG. 4), wherein the captured image processing sensor 451 may be separated from the image capturing sensor 421. There may be several digital image capturing sensor in a single device, e.g., to generate VR videos (360°) or to stabilize the image. A digital sensor may be combined with an optical image stabilizer to obtain enhanced images (i.e., without abrupt shifts or jitters). The sound capturing sensor (microphone) 441, 524, 614 may be represented by any suitable microphone capable of capturing ambient sound and transmitting it as an analog or digital signal to the motherboard 461, 523, 619 for further processing. There may be several microphones used to obtain stereo sound instead of mono sound. The CPU card 461, 523, 619 processes the video stream received from the sensors to capture images 421, 501, 611, i.e., stabilizes the video stream, encodes it using conventional codecs (e.g., h.264, h.265, MJPEG, proprietary codecs, etc.), enhances images, etc.

All the components of a wearable device should be located inside the same body, except the camera. However, in some embodiments, the camera can also be located inside the device's body to make it easier to put the device on different helmets, to reduce its weight and to improve its safety. The battery life should be enough for the required work period (one hour at least). The wearable device may comprise a charging unit and may be quickly replaceable (within 2-3 mins). There may be any number of wireless modems 431 and 432, 531 and 532, 621 and 622 inside each device, but at least two, to use several high-speed data transfer channels simultaneously to send data to access points 121-124, 125-128. The second modem or the third modem may be a WI-FI/LTE/5G modem or a different transmitter mounted on the CPU board. External antennas 402, 512, 605 can enhance radio signal quality, i.e., enhance the quality of the transmitted signal (audio and video stream), reduce the number of errors, reduce the number of repeat requests for lost packets, and reduce the number of access points to be placed around the work area.

The wearable device may be equipped with a slot for a replaceable memory card that stores the received audio and video data. The wearable devices 101-111 may comprise GPS/GLONASS sensors or different geolocation sensors to track the movement of these devices. In order to locate a wearable device 101-111 inside the work area (if there is no roof), the geolocation data can be used together with the processed audio and video data provided by the access points 121-124, 125-128 (i.e., quality of signals transmitted by a wearable device to the access point and the amount of data channeled through the access point at a given moment in time) to obtain more accurate coordinates of a wearable device 101-111.

Geolocation data—alone or together with AI capable of recognizing movement—may be used to turn the broadcasting on or off, e.g., when a player enters the playing field, or a police officer leaves the car to start their duty. In order to prevent the wearable device from catching fire in case it is destroyed due to an external impact, the device may be equipped with a smoke/fire detector that would trigger the immediate extinguishing device. Otherwise, the wearable device may be made of fireproof or fire-resistant materials, absorbing materials, etc. The battery may have additional mechanical protection to prevent fires.

Figure 2:
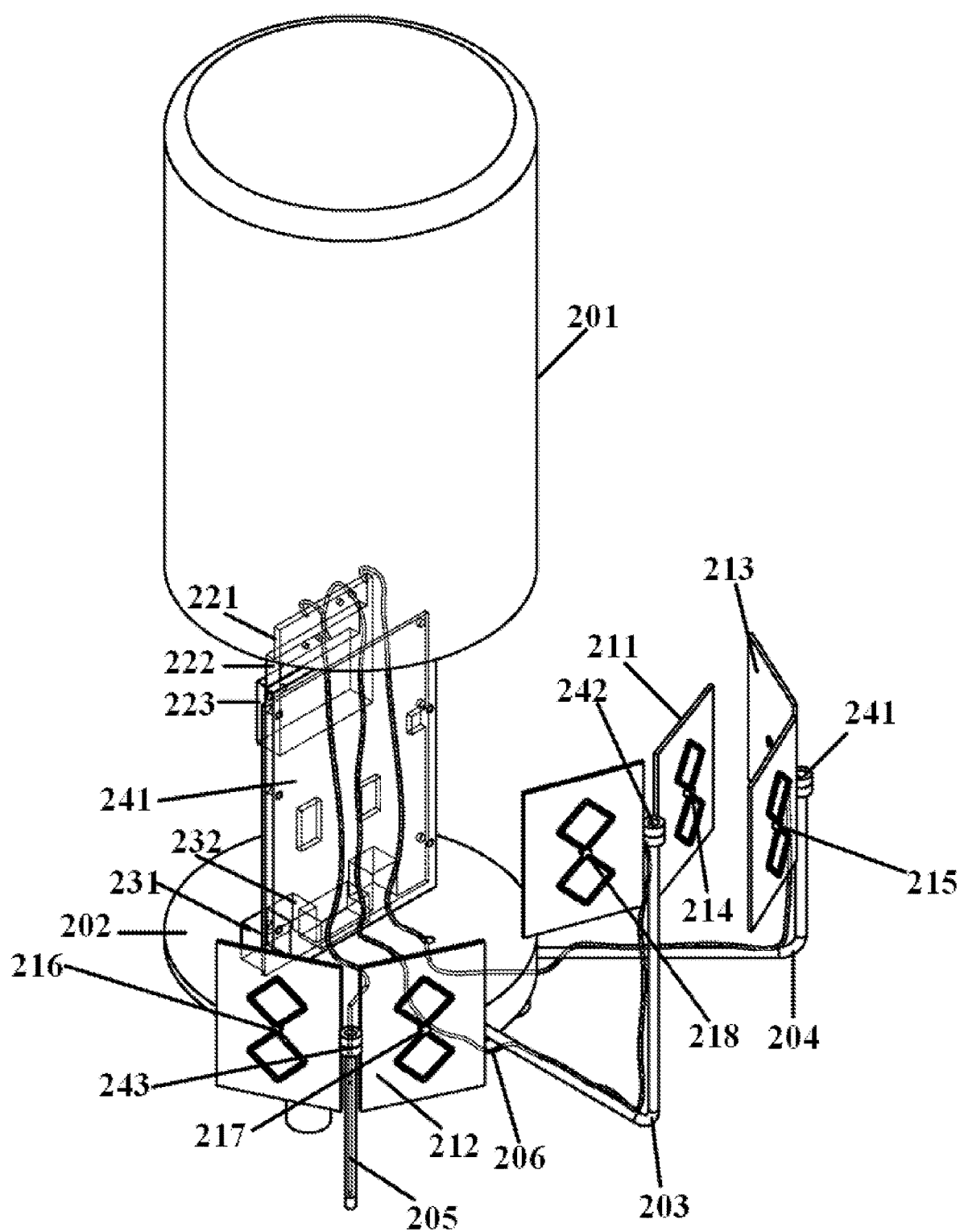
FIG. 2 illustrates an exemplary embodiment of an access point with three network cards to establish three radio networks.
Figure 3:
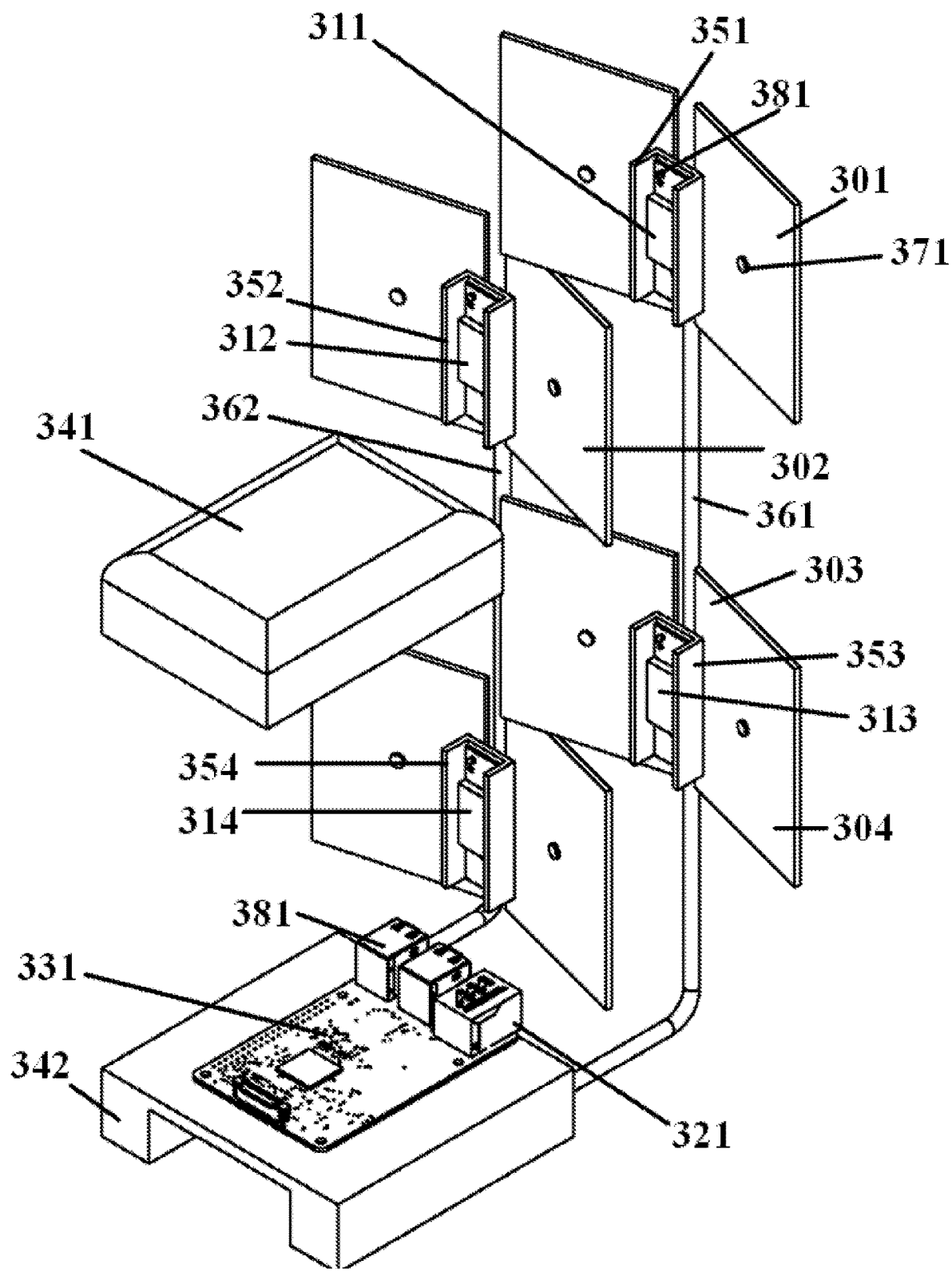
FIG. 3 illustrates an exemplary embodiment of a 'sponge' receiver with four modems.

FIGS. 2 and 3 illustrate exemplary embodiments of access points. FIG. 2 shows an exemplary "central" access point 121-124 comprising: a body 201, 202, which may be made of plastic or a different material by means of 3D printing, pressure casting, or otherwise; an antenna comprising mounts 203-205, antenna components 241-243, and HF cables 206 running from radio cards 221-223 that are connected to the motherboard 241; wherein the motherboard 241 may have several Ethernet sockets 231, 232 to connect the access point to LAN and communicate with the main server 131. There may be several motherboards 241 installed in a single body 201, 202, e.g., motherboards for WI-FI 2.4 GHz/WI-FI 60 GHz/WI-FI 5 GHZ or different combinations thereof, or other radio access technologies.

It should be noted that the present solution uses several parallel/aggregated wireless communication channels at once to provide multi-point communication. There may be one or several radio cards 221-223 in the motherboard 241, depending on the number of wearable devices 101-111 in the work area (playing field). The exemplary access points use directional antennas with reflectors. These antennas are directed at the parts of the work area, where bi-directional communication with audio/video broadcasting wearable devices is required. Modern equipment uses the MIMO technologies, which allows to use twice as many antennas in each access points or wireless modem. Such configuration allows to improve the radio system functional quality. However, different deployments of radio equipment are also possible, e.g., suspended above the arena, or rigged to lighting, etc., which may require antennas of other types to be used, particularly, omnidirectional antennas.

FIG. 3 illustrates an exemplary "sponge" receiver 125-128, used for gathering additional data from wearable devices 101-111 and radio spectrum analysis. The "sponge" receivers 125-128 comprise: a box 341-342, a motherboard 331 that includes USB sockets 381 used to connect modems 311-314, an Ethernet socket 321 used to connect to LAN and communicate with the main server 131. Mounts for antennas and modems 361, 362, with power and data cables 311-314 for modems and HF cables 301-304 for antennas inside, are attached to the body of a "sponge" receiver. Depending on the receiver location, different antennas may be used, i.e., directional, narrow-band, or omnidirectional ones, like in "central" access points 121-124 (see FIG. 2). Please note that the present solution mostly uses several wireless modems at, e.g., WI-FI 2.4 GHz+Wi-FI 5 GHz, WI-FI 5 GHz+UWB or different combinations thereof.

Depending on the number of active wearable devices 101-111 and channels that are used simultaneously for parallel data transfer and aggregation, there may be three or more modems 311-314 used. Depending on the number of radio access technologies used inside the system to gather data from all active wearable devices, e.g., WI-FI/UWB/5G, the number of modems inside the receivers may be equal to or less than the number of technologies.

One of the main aspects of this disclosure is using several wireless modems in a single wearable device to provide for multi-point communication between wearable devices and access points, for several communication channels working in parallel, for continuous operation even if one of the channels contains errors, and for distributed data reception. Another aspect is using several wireless communication channels between wearable devices and the server (coordinated multi-network data transmission). In an exemplary embodiment, this may be achieved by using two or more modems inside the wearable device, in order to simultaneously transfer data over these connections. This allows to provide multipoint (coordinated multi-network data transmission) communication between wearable devices and the server. Another important aspect of this disclosure is distributed reception of data, wherein the data transferred via one of the multiple modems (one of the radio access technologies used) will be received by one or several central access points, as well as by additional access points ("sponge" receivers), which results in multiple streams containing the same data being transmitted to the server simultaneously. Any data losses in either stream will be offset by a different data stream provided by an additional access point ("sponge" receiver), thus enabling coordinated data transmission/reception.

These technologies allow to provide for a more stable and quality data/content transfer (with minimum latency and error rate) from wearable devices 101-111 to the main server 131. Multi-point communication between the wearable devices 101-111 and access points 121-124, 125-128 allows several access points 121-124, 125-128 to receive data from the wearable devices 101-111 within their coverage at once. Some of these access points are "central" access points 121-124, providing bi-directional communication with the wearable devices 101-111, while the others are "sponge" receivers 125-128, which receive additional data from the wearable devices 101-111 and forward them to the main server 131 only.

Figure 9A:
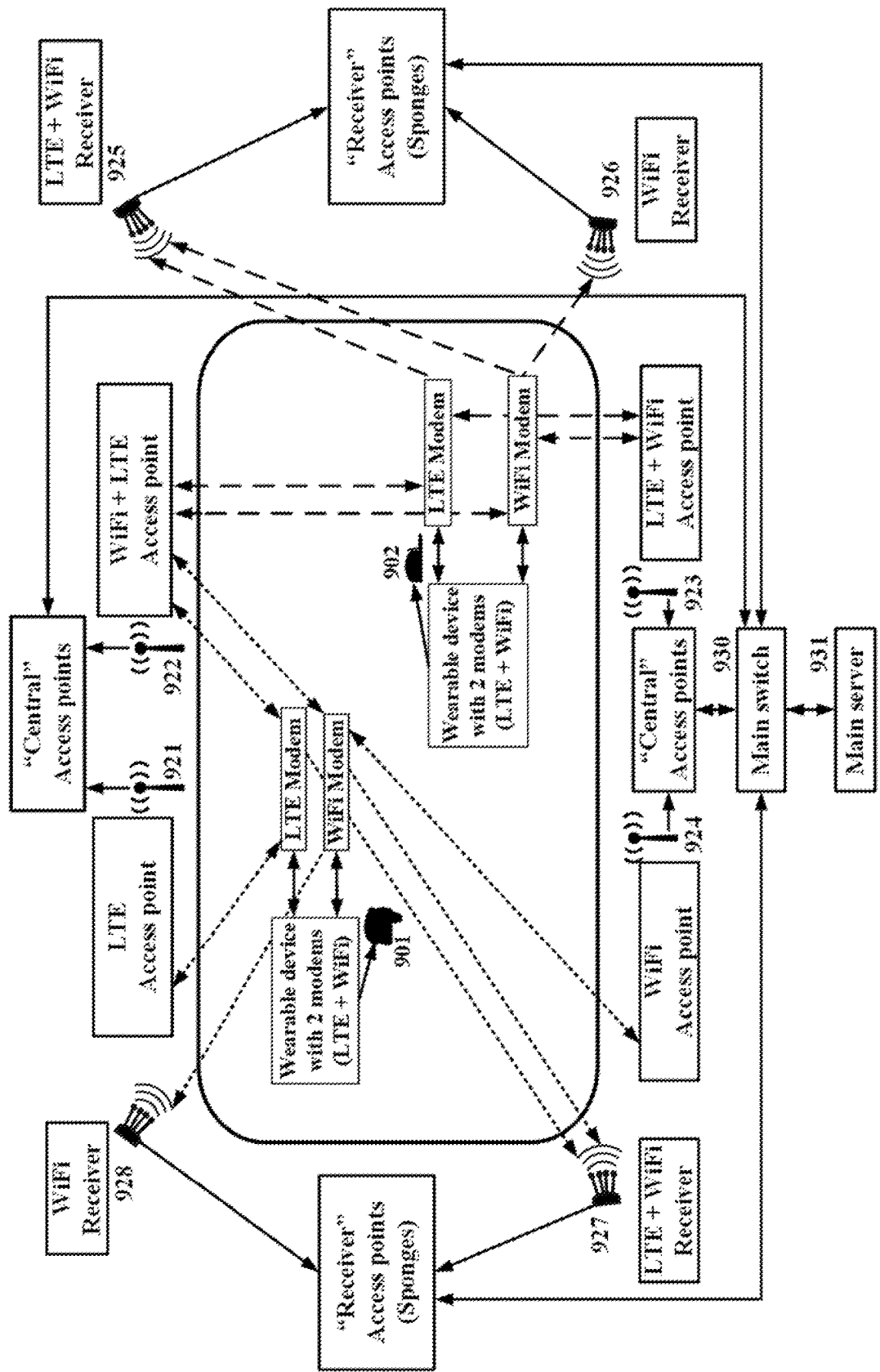
FIG. 9A illustrates and exemplary diagram of data exchange between a wearable device (camera) and access points, using two radio access technologies, i.e., WI-FI and LTE, and two modems integrated into the wearable device.

FIG. 9A illustrates an exemplary deployment of the system using two radio access technologies (WI-FI and LTE), which are employed simultaneously (in parallel). In this embodiment, there are two modems (WI-FI and LTE) in a wearable device 901. The wearable device 901 is located in the upper part of the work area and is capable of establishing connections with three "central" access points 921, 922, and 924, through which the (bi-directional) data exchange with the main server 131 is carried out. Distributed receivers 927, 928 allow to receive additional data from the wearable device 901, forwarding the additional data to the main server 131 for processing. The main server 131 receives several input streams containing the same data, from a single wearable device 901, and discards the repeats, generating a stable audio and video output stream.

As the wearable device is moving around, the number of data streams transmitted to the main server 131 may reach four or more, depending on the location of the device. For instance, the wearable device 902 is located on the opposite side of the work area, where it can establish bi-directional communication with "central" access points 922, 923, whereas the data transmitted from this device can also be received by additional access points, i.e., "sponge" receivers 925, 926 that will forward the data to the main server 131 for processing.

By using two parallel high-speed wireless data channels, it is possible to avoid problems faced by devices that operate at one high-speed data channel only. The problems include: unstable signal feed from wearable devices to the main server (communication losses due to abrupt movement, blocking by other objects/subjects, or radio shadows); multiple repeats of lost data packets (datagrams); increased latency due to multiple repeated requests; insufficient bandwidth in case all active wearable devices have moved into the same part of the work area, or the number of wearable devices increases (e.g., when all reserve players come onto the field, or the number of security/police officers equipped with the wearable devices increases).

Also, the problems may arise due to poor SNR (signal-to-noise ratio) caused by external noise or overlapping frequencies (e.g., in case the system comprising multiple wearable devices is deployed in an environment where there are not enough available frequencies). If several radio access technologies are used (see FIG. 9A), then break-offs in one channel will be offset by communication over another channel, i.e., the data, which have been lost when being transmitted over one wireless communication channel, will be transmitted over another wireless channel.

When two or more wireless channels are used, it is possible to avoid problems caused by noise on the frequency used by either of the wireless channels, i.e., the data, which have been lost when being transmitted over one channel, will be transmitted over another wireless channel. When two or more modems (channels) are used in a single wearable device at once, the device is capable to switch between frequencies without interrupting the audio and video streaming, by tuning one modem (channel) to a new frequency first, then another.

When data reception is maintained by two types of distributed access points (i.e., "central" access points and "sponge" receivers), it is possible to avoid problems caused by losing some packets/datagrams due to the wearable device being blocked by other objects/subjects, or radio shadows. In case the lost data cannot be recovered, despite all the effort to avoid this, the control data packets will reach the wearable device via several "central" access points to trigger a certain instruction to recover data or clear the buffer. If a wearable device has two or more modems for receiving data from "central" access points, it will be able to receive two or more control data streams, correspondingly, thus making the control channel more reliable.

Figure 9B:
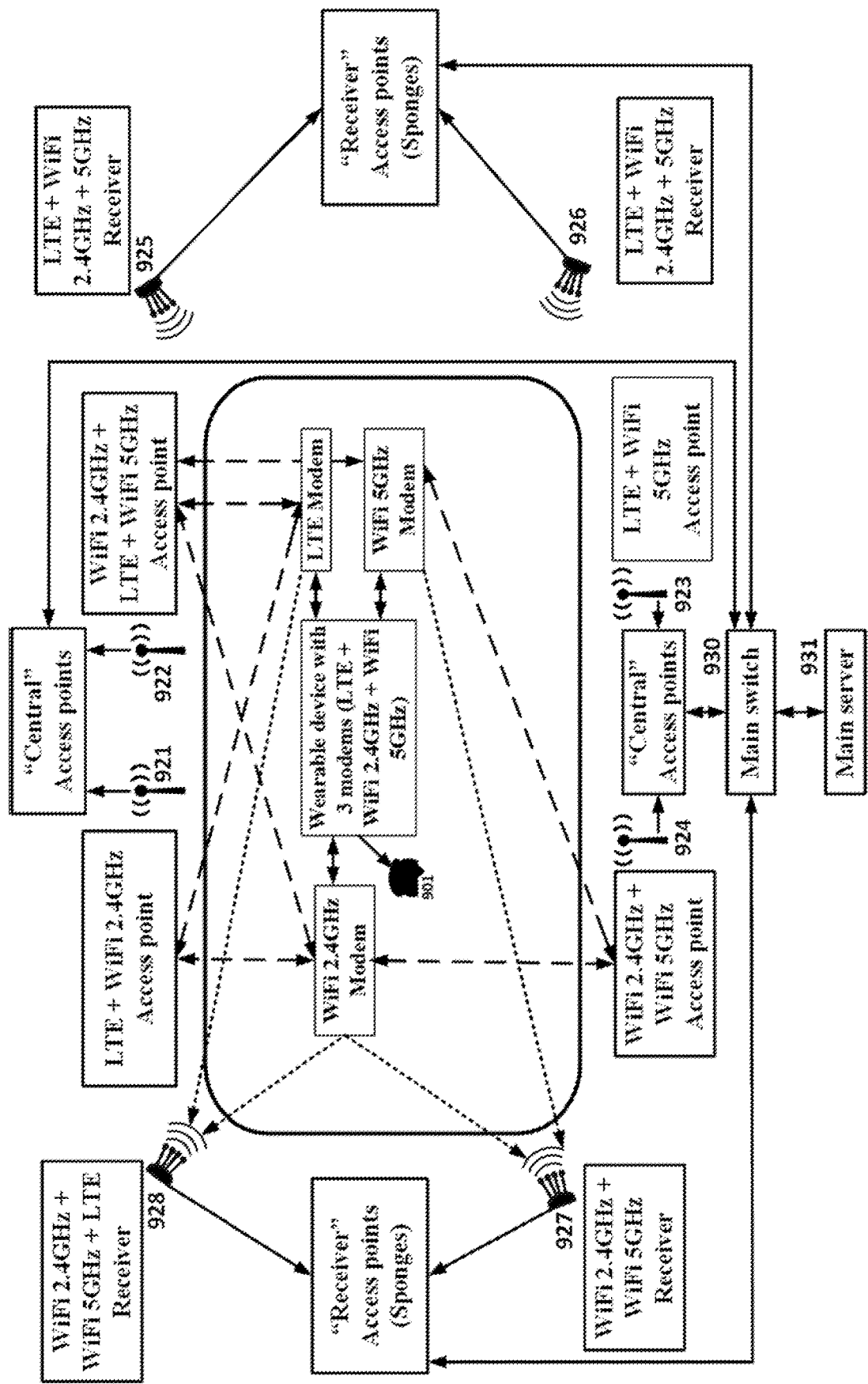
FIG. 9B illustrates and exemplary diagram of data exchange between a wearable device (camera) and access points, using three wireless channels, i.e., WI-FI 2.4 GHz, WI-FI 5 GHz and LTE, and three modems integrated into the wearable device.

FIG. 9B illustrates another exemplary deployment of the system using three wireless channels: WI-FI 2.4 GHz, WI-FI 5 GHz, and LTE. The wearable device 901 has three wireless modems on board, each corresponding to the technologies in use. Located in the upper part of the work area, the wearable device 901 may establish bi-directional communication with three distributed "central" access points 921, 922, 924. Also, the data transmitted by the wearable device 901 may be received by distributed "sponge" receivers 927, 928 and then forwarded to the main server 931 for processing. When three or more modems are used inside a single wearable device, their load can be distributed as follows: two modems can be used to transmit (in parallel) the video data only, while the third modem is used to transmit the audio data and repeatedly requested (i.e., lost) video data. All three modems may be used for parallel data transmission and to obtain a more stable stream, which makes it less probable that the data transmitted from the wearable devices to the main server get lost.

According to another option, two modems may transmit the audio and video data streams in parallel, but in case signal quality of either of these modems deteriorates too much, or either of the two wireless channels produces too much error, one of the data streams may be switched to the third modem, while the faulty one will be put on reserve. According to yet another option, the modem load can be distributed as follows: 100% of data are transmitted via the first modem, 70% of data are transmitted via the second modem, while repeats and control signals are transmitted via the third modem. When several radio access technologies, along with several wireless modems, respectively are used inside a single wearable device simultaneously/in parallel, it is possible to cover large or complex work areas without connection losses. Coverage has to be planned in such a way that a wearable device always provides the main server—and the users—with a stable audio and video stream, wherever it is located in the work area.

In an exemplary embodiment, the system may be deployed on a sports arena using personal (designed) access points 121-124, 125-128 (i.e., a closed-circuit system) to gather data from and exchange data with the wearable devices 101-111 (see FIG. 1A). The access points 121-124, 125-128 may be mounted on stands near the playing field, in the middle of the arena (near the viewers), or suspended above the arena (on the screen cube or under the roof), or on sideboards or immediately behind them. In an exemplary embodiment of the system, the wearable devices 101-111 have two WI-FI modems inside (431, 432; 531, 532; 621, 622). The modems may use different standards, such as WI-FI/LTE/3G/UWB/5G, or various combinations thereof, e.g., WI-FI+WI-FI, WI-FI+LTE, UWB+WI-FI+LTE, but there have to be at least two modems (two data transfer channels).

The "sponge" receivers 125-128 always have at least three modems 311-314 each, wherein two modems are used to gather data from active wearable devices 101-111, and one modem (since one radio access technology is employed) is used to scan the radio spectrum/channels and to send to the main server 131 information about which frequency bands (with less noise) may be used in the given time period. To ensure correct data gathering, there should always be at least two "sponge" receivers in the work area. The system may also comprise a control laptop/tablet 132, which has a setup interface for wearable devices 101-111, "central" access points 121-123, and "sponge" receivers 125-128. The control laptop/tablet 132 may be used to diagnose operability and integrity of both the system as a whole and its individual components, as well as to manage the wearable device 101-111 settings, such as white balance, image depth, resolution, frame rate per second; to turn data transfer on and off, etc.; and to set the parameters for access points 121-124 and receivers 125-128, such as the number of wearable devices, working frequency bands, etc.

The control laptop/tablet 132 can also be used to preview footage from any wearable device, as well as to connect to any wearable device via audio and communicate with the wearer. When the system is started for the first time, the control laptop/tablet 132 requests via the main server 131 that the receivers 125-128 provide information about frequencies with the most favorable signal-to-noise ratio. At the same moment, all wearable devices 101-111 tune to the default frequency and wait until the control laptop/tablet 132 instructs them to tune to a new frequency. After receiving their working frequencies, the wearable devices 101-111 can be used inside the work area. After that, during the system's operation, the tuning process is governed by a dedicated algorithm of the main server 131, which, after regular time intervals, requests that the receivers 125-128 provide the current signal-to-noise ratio.

The wearable devices 101-111, "central" access points 121-124, and "sponge" receivers 125-128 are ready to operate after each is assigned a working frequency by the control laptop/tablet 132. After the whole system is ready to operate, the control laptop/tablet initiates all wearable devices, so that video and audio data are streamed to the main server 131. The main server 131 is connected to the show farm 137, comprising several servers, which may carry out audio/video re-coding or image enhancing (framerate increasing, image stabilizing, resolution or image depth increasing, etc.) by means of the AI, as well as recognize objects, faces, or movements. The data received by the main server 131, which have been processed on the show farm 137, may be forwarded to CDN 133 and then to any user device; or via the show farm 137 to a mobile TV station 138 or, via the main server 131 to Internet viewers or, through additional WI-FI hotspots, to viewers at the arena, and then on air.

The main server 131 is connected over the Internet 135 to the license server 136, which monitors each wearable device 101-111, i.e., checks their remaining (paid) operation times, the location of the while system (and whether it is operated correctly), and fulfills the same functions as the control laptop/tablet 132, but remotely. During the system operation, the receivers 125-128 may notify the main server 131 that one of the frequencies, at which a wearable device operates, or both of them, have become unavailable, or that there is much noise, and the device has to tune to a new frequency. The main server 131 sends a control signal via the "central" access points 121-124 to the "sponge" receivers 125-128, instructing one or both modems (431, 432; 531, 532; 621, 622) to tune to a new frequency. The wearable device 101-111 tunes to the new frequency step by step, without interrupting its streaming; first one modem, then another.

One of the aspects of this disclosure is the use of the WI-FI radio access technology that has been modified for operating on mass gatherings. In an exemplary embodiment, in order to improve the system and to reduce interference from other devices inside the work area (fans with cell phones, workers, people, other radio devices) that may cause losses and increase latency, the standard band segmentation used in WI-FI, i.e., 20/40/60/etc. MHz-wide bands, may be inapplicable in the conditions of a mass gathering of people because of noise and access point overloading with "outside" data. Therefore, according to the present disclosure, standard bands may be shifted by several MHz, e.g., 5120 MHz->5130 MHz; 5180 MHz->5185 MHz.

Also, encoded standard WI-FI packets can be used (beacon, probe request, probe response, authentication, deauthentication, etc.) in order to protect access points and reduce their load caused by "outside" data from multiple devices located within the work area or nearby. These enhancements can be used together or separately, e.g., encoded standard WI-FI packets and band shifts will make access points 121-124, 125-128 see the relevant wearable devices 101-111 only. In order to reduce the latency of data transfer from the wearable devices 101-111 to the access points 121-124, 125-128, the WI-FI protocol stack may be modified, particularly, for example, by turning off packet delivery confirmations in the WI-FI protocol core. Standard delivery confirmations within the WI-FI protocol (between the access points 121-124 and the wearable devices 101-111) can be substituted with proprietary delivery algorithms, both with and without confirmation, and WI-FI can be used only as an instrument that doesn't guarantee that the data have been delivered from the wearable devices 101-111 to the main server 131.

In an exemplary embodiment, the system may be deployed on a sports arena using personal (designed) access points 121-124, 125-128 (i.e., a closed-circuit system) to gather data from and exchange data with the wearable devices 101-111 (see FIG. 1A). The access points 121-124, 125-128 may be mounted on stands near the playing field, in the middle of the arena (near the spectators), on sideboards or immediately behind them, or suspended above the arena (on the screen cube or under the roof). In an exemplary embodiment of the system, the wearable devices 101-111 have two modems inside, a WI-FI modem and an LTE modem (431, 432; 531, 532; 621, 622, respectively). In the same embodiment, "sponge" receivers 125-128 have at least four modems 311-314 each (depending on the number of wearable devices), wherein two modems are used to gather data from active wearable devices 101-111, and further two modems are used to scan the radio spectrum (channels) and to send the main server 131 information about which frequency bands may be used in the given time period (since two different radio access technologies are used).

To ensure correct data gathering, there should always be at least two "sponge" receivers in the work area. The system may also comprise a control laptop/tablet 132, which has a setup interface for wearable devices 101-111, "central" access points 121-123, and "sponge" receivers 125-128. The control laptop/tablet 132 may be used to diagnose operability and integrity of both the system as a whole and its individual components, as well as to manage the wearable device 101-111 settings, such as white balance, image depth, resolution, frame rate per second; to turn data transfer on and off, etc.; and to set the parameters for access points 121-124 and receivers 125-128, such as the number of wearable devices, working frequency bands, etc. The control laptop/tablet 132 can also be used to preview footage from any wearable device, as well as to connect to any wearable device via audio and communicate with the wearer.

When the system is started for the first time, the control laptop/tablet 132 requests via the main server 131 that the receivers 125-128 provide information about frequencies with the most favorable signal-to-noise ratio. At the same moment, all wearable devices 101-111 tune to the default frequency and wait until the control laptop/tablet 132 instructs them to tune to a new frequency. After receiving their working frequencies, the wearable devices 101-111 can be used inside the work area. After that, during the system's operation, the tuning process is governed by a dedicated algorithm of the main server 131, which, after regular time intervals, requests that the receivers 125-128 provide the current signal-to-noise ratio.

The wearable devices 101-111, "central" access points 121-124, and "sponge" receivers 125-128 are ready to operate after each is assigned a working frequency by the control laptop/tablet 132. After the whole system is ready to operate, the control laptop/tablet initiates all wearable devices, so that video and audio data are streamed to the main server 131. The main server 131 is connected to the show farm 137, comprising several servers, which may carry out audio/video re-coding or image enhancing (framerate increasing, image stabilizing, resolution or image depth increasing, etc.) by means of the AI, as well as recognize objects, faces, or movements.

The data received by the main server 131, which have been processed on the show farm 137, may be forwarded to CDN 133 and then to any user device; or via the show farm 137 to a mobile TV station 138, and then on air. The main server 131 is connected over the Internet 135 to the license server 136, which monitors each wearable device 101-111, i.e., checks their remaining (paid) operation times, the location of the whole system (and whether it is operated correctly), and fulfills the same functions as the control laptop/tablet 132, but remotely. During the system operation, the receivers 125-128 may notify the main server 131 that one of the frequencies, at which a wearable device operates, or both of them, have become unavailable, or that there is much noise, and the device has to tune to a new frequency.

The main server 131 sends a control signal via the "central" access points 121-124 to the "sponge" receivers 125-128, instructing one or several modems (431, 432; 531, 532; 621, 622, respectively) to tune to a new frequency. The wearable device 101-111 tunes to the new frequency step by step, without interrupting its streaming; first one modem, then another.

In another exemplary embodiment, the system may be deployed at a mass event to be used by the security or police (see FIG. 1B). In this embodiment, the system for gathering data from wearable devices is not closed-circuit, since two of the "central" access points 121, 122 use public networks, such as WI-FI, LTE, 3G, etc., and two other "central" access points 123, 124 use personal (designed) radio access points, such as WI-FI, LTE, etc., and may be mounted on or inside cars, buildings, or elsewhere. In the same deployment, the "sponge" receivers 125-128 surrounding the work area, e.g., mounted on buildings or in police cars, may have modems for gathering data that have been sent to both the "central" access points 121, 122 and the "central" access points 123, 124, or a combination thereof.

The wearable devices 101-111 also use two wireless transceivers for communication and transmitting data to the main server 131 through both paths via the "central" access points 121, 122 and 123, 124. The system can be controlled, if the communications operator provides interactive functions. The system may also comprise a control laptop/tablet 132, which has a setup interface for wearable devices 101-111, "central" access points 123, 124, and "sponge" receivers 125-128. The "central" access points 121, 122 are public, so they can be controlled (their settings can be changed) in case an operator provides functions for communication.

The control laptop/tablet 132 may be used to diagnose operability and integrity of both the system as a whole and its individual components, as well as to manage the wearable device 101-111 settings, such as white balance, image depth, resolution, frame rate per second; to turn data transfer on and off, etc.; and to set the parameters for access points 123, 124 and receivers 125-128, such as the number of wearable devices, working frequency bands, etc. The control laptop/tablet 132 can also be used to preview footage from any wearable device, as well as to connect to any wearable device via audio and communicate with the wearer (duplex audio communication). When the system is started for the first time, the control laptop/tablet 132 requests via the main server 131 that the receivers 125-128 provide information about frequencies with the most favorable signal-to-noise ratio.

The signal-to-noise ratio is requested only for the radio access technology that is used in the system (i.e., "central" access points 123, 124; "central" access points 121,122 use the frequencies that have been set by the communications operator or access point engineer). At the same moment, all wearable devices 101-111 tune to the default frequency and wait until the control laptop/tablet 132 instructs them to tune to a new frequency. After receiving their working frequencies, the wearable devices 101-111 can be used inside the work area. After that, during the system's operation, the tuning process is governed by a dedicated algorithm of the main server 131, which, after regular time intervals, requests that the receivers 125-128 provide the current signal-to-noise ratio.

The wearable devices 101-111, "central" access points 123-124, and "sponge" receivers 125-128 are ready to operate after each is assigned a working frequency by the control laptop/tablet 132. After the whole system is ready to operate, the control laptop/tablet 132 initiates all wearable devices, so that video and audio data are streamed to the main server 131. Some data from the wearable devices 101-111 are transmitted via internal "central" access points 123, 124 and "sponge" receivers 125-128 by LAN to the main server 131, while some data from the external "central" access points 121, 122 are transmitted via the Internet or WAN 135 to the main server 131 immediately, not entering LAN. The main server 131 is connected to the show farm 137, comprising several servers, which may carry out audio/video re-coding or image enhancing (framerate increasing, image stabilizing, resolution or image depth increasing, etc.) by means of the AI, as well as recognize objects, faces, or movements.

The data received by the main server 131, which have been processed on the show farm 137, may be forwarded to CDN 133 and then to any user device; or via the show farm 137 to a mobile TV station 138, and then on air. The main server 131 is connected over the Internet 135 to the license server 136, which monitors each wearable device 101-111, i.e., checks their remaining (paid) operation times, the location of the whole system (and whether it is operated correctly), and fulfills the same functions as the control laptop/tablet 132, but remotely.

During the system operation, the receivers 125-128 may notify the main server 131 that the frequency, at which a wearable device operates, has become unavailable, or that there is much noise, and the device has to tune to a new frequency. The main server 131 sends a control signal via the "central" access points 123, 124 to one of the wearable devices 101-111, instructing one of its modems to tune to a new frequency. During the system operation, the frequencies used by the "central" access points 121, 122 may be changed (e.g., by an engineer, a communications operator, etc.). The main server 131 may signal the receivers 125-128 via LAN that (public) "central" access points 121, 122 have switched to a new frequency, so several modems inside the receivers 125-128, as well as one of the modems inside the wearable devices 101-111 have to be tuned to the new frequency.

Each wearable device may have a BLUETOOTH earphone or wired headset for full duplex audio communication with the wearer. In an exemplary embodiment, communication with the wearer can be carried out via control laptop/tablet 132, which may have a mic installed that captures ambient sounds, encodes them and sends them via the main server to the wearable device 101. Once received by the wearable device 101, the data are repacked and forwarded via BLUETOOTH to the BLUETOOTH earphone in the wearer's ear, then decoded and played by the earphone's built-in speaker. In case a wired headset is used, then the data received from the tablet 132 are decoded by the wearable device 101 and played back to the wearer. Audio input, including the wearer's voice, from around the helmet are captured by the microphone(s) inside the wearable device 101-111, and then sent to the main server 131, either in parallel, using wireless communication channels (the modems inside the wearable devices), or in different ways, wherein some data are sent via one modem, while some data are sent via another modem, etc. From the main server 131, the data are passed to the control laptop/tablet, then decoded and played by the control laptop/tablet 132 built-in speaker. The control laptop/tablet can be substituted with a smartphone that has a large enough screen.

In yet another exemplary embodiment, the show farm 137 may be comprised of servers that are capable of displaying content on screens connected to the show farm, in addition to decoding and enhancing (recognizing) data using AI. Earphones and microphones, including BLUETOOTH headsets, can be connected to the show farm 137 servers for full duplex audio communication with each wearable device 101-111. In case wired headsets are used, then the data received from the show farm 137 are decoded by the wearable devices 101-111 and played back to the wearers via wired headsets. This embodiment may be employed, e.g., at team training sessions, where the coach can monitor players' movements through show farm 137 screens and give instructions via duplex audio communication; at mass events to provide communication between security/police officers; or elsewhere. Audio input from show farm 137 microphones are encoded and sent via "central" access points 121-124 to wearable devices 101-111. Once received by the wearable devices 101-111, the data are repacked and forwarded via BLUETOOTH to the BLUETOOTH earphones in the wearers' ears, then decoded and played by the earphones' built-in speakers. Audio input, including the wearer's voice, from around the helmet are captured by the microphones inside the wearable devices, and then sent to the main server 131, either in parallel, using wireless communication channels (the modems inside the wearable devices), or in different ways, wherein some data are sent via one modem, while some data are sent via another modem, etc. From the main server 131, the data are passed to the show farm 137, then decoded and played by the speakers/earphones that are connected to the show farm 137 servers.

In some embodiments of the present disclosure, the wearable device may be complemented by a tablet/smartphone to display information received from an expert/coach/supervisor in a remote location, in case the claimed system is used for remote consultations at an enterprise or during a training session, etc. The tablet/smartphone may display the information that the expert wants to highlight, e.g. which bolt to loosen, which valve to turn, etc. In other embodiments, the wearable device may have a small screen mounted over the right eye or the left eye to display instructions given by an expert/coach.

Figure 7:
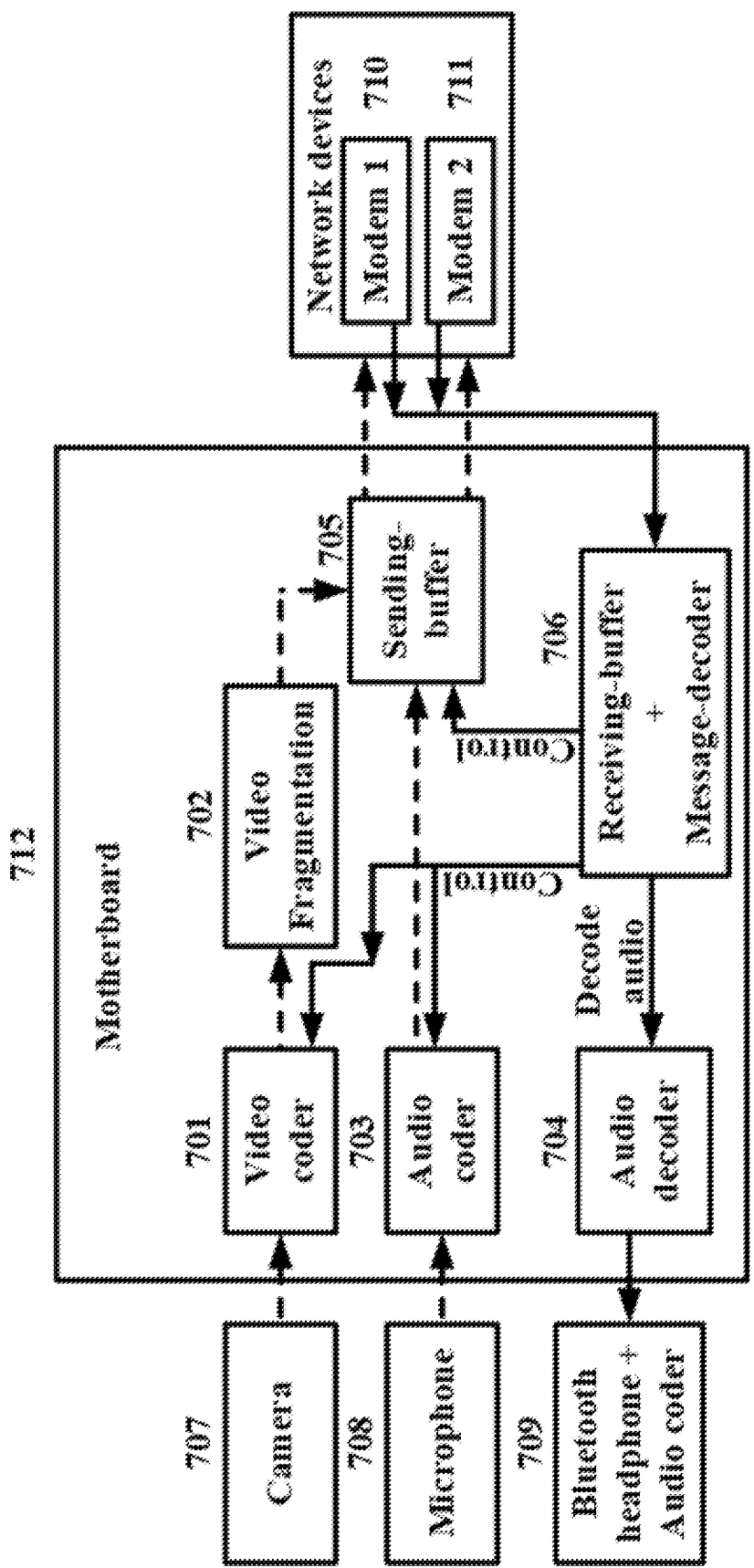
FIG. 7 is a flowchart illustrating the steps of generating and transferring content from the wearable devices to the main server.

FIG. 7 illustrates a flowchart with the software steps of generating and transferring audio and video data from the wearable devices 101-111, and of receiving and processing data from the main server 131 by a wearable device. A video sensor 707, a mic 708, and a BLUETOOTH or wired earphone 709 are connected to the CPU module 712. Two wireless network modems 710 and 711 (two data transfer channels) are connected to the CPU module for communicating with the data transfer network to exchange datagrams with the main server 131 of the system. The modems may employ various radio access technologies, such as WI-FI, LTE, 5G, UWB, or a combination of different modems can be used, e.g., WI-FI+WI-FI/WI-FI+LTE/WI-FI+3G+5G. There should be at least two modems to provide multiple data transfer channels.

The radio networks should have a latency of no more than 0.5 sec for transmitting data. To work with Wi-Fi, UWB, LTE, 5G, or 3G modems is used the UDP protocol. The video sensor input is sent to the software video coder 701, which may use hardware acceleration for data encoding. Hardware acceleration may also be used to stabilize or recognize video, or for other additional functions. The video coder 701 output is sent frame by frame as a stream to the software video fragmentation unit 702. The fragment size may range from 50 bytes to 65,000 bytes, depending on the wireless data transfer technology employed. The fragment size is determined to be close to the modem's minimum MTU (maximum transmission unit) size. Then, the fragments are sent to the sending buffer 705 having a fixed size, which is large enough to collect the amount of data corresponding to the maximum declared latency in each specific case and depending on the speed at which wearable devices are moved around the work area (up to 1 sec, preferably less than 0.5 sec). Between the send buffer 705 and the fragmentator 702 there can be the FEC modules and the Interleaving modules. The FEC (Forward Error Correction) module is only used if the radio network through which data is transmitted has no FEC of its own. The Interleaving is selected to be equal to or smaller than the network latency (no more than the duration of a single frame, with t=1/FPS (frames per second). The microphone 708 input is sent to the audio coder 704, where it is fragmented and then sent to the sending buffer 705. The fragment size may range from 50 bytes to 65,000 bytes, depending on the wireless data transfer technology employed. Fragment sizes cannot exceed the modem's minimum MTU size. All fragments are sent to the sending buffer along with their control footing (heading), such as data type and fragment number, etc. From the sending buffer 705, the data are sent via both modems 710 and 711 to the main server 131. The data from the sending buffer 705 can be sent to the main server 131 in different ways, depending on the main server's 131 instructions, e.g., via parallel data transfer channels using both modems 710 and 711. Otherwise, in case three modems are used, the data load may be distributed, e.g., two modems may be used for operating video and audio data and control, while the third modem may be used to send repeats and key frames of the encoded video (i.e., reference frames used in modern codecs, such as h.264, h.265, and others).

There will always be redundancy in the data gathered within the system, regardless of the ways the data are being transmitted and the load distribution between modems in the wearable devices 101-111, because multiple access points 121-124, 125-128 are used, which duplicate the data transfer network (i.e., operate on the same frequency) receiving the same data that have been sent to the server. Audio fragments are transmitted twice, with a delay that is determined based on the typical fading length in the radio network. Also, audio data are transmitted with a shifted buffer, so that a given audio fragment is transmitted at least ten times. Video stream uniformity may depend on the audio data, wherein the video may be synchronized using audio timestamps. As the buffer overflows, old video fragments are deleted.

Datagrams that have been received by the modems 710 and 711 from the main server 131 are separated in the receiving buffer and message decoder 706. Some datagrams are interpreted as control signals, while others may be audio data packets. Audio data are sent to the audio decoder 704, pass through the audio codec and are forwarded to the BLUETOOTH earphone 709. Control signals from the receiving buffer 706 may instruct the sending buffer 705 to repeat certain fragments or dump a portion of data; the video coder 701 to call extraordinary key/I frames (used by modern video codecs) in order to control latency, jittering, and to control the encoding quality; or the audio encoder 703 to repeat requests, switch codecs, etc.

Described below is an example of receiving data from the wearable devices 101-111 by the main server 131. As the data are being sent from the wearable devices 101-111 via two or more modems (depending on their configuration inside the wearable devices), several copies of the same data are created to be received by several distributed "central" access points 121-124 and several distributed "sponge" receivers 125-128. Each of the "central" access points 121-124 may establish connections to 1-64 wearable devices, depending on the radio technologies (WI-FI/LTE/UWB/5G/3G/Other) used in the given embodiment. Each of the "sponge" receivers 125-128 may gather data from 1-16 wearable devices, depending on the radio technologies (WI-FI/LTE/UWB/5G/3G/Other) used in the given embodiment.

Figure 8:
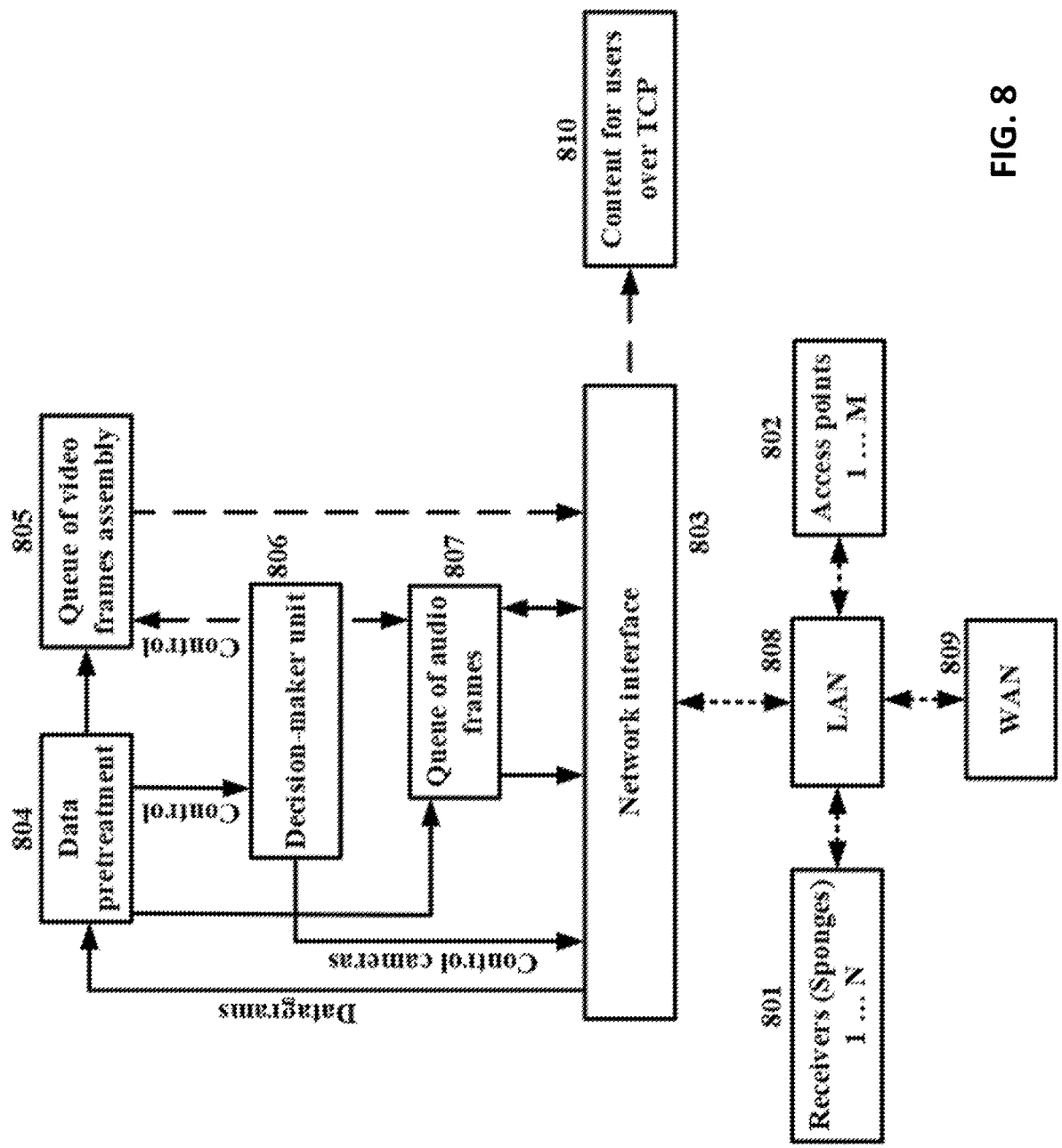
FIG. 8 is a flowchart for the server side illustrating the steps of receiving the content from the wearable devices and processing it by the main server.

FIG. 8 illustrates a flowchart of an exemplary method for processing the data received from the wearable devices 101-111 by the main server 131. The data gathered by the "central" access points 802 and "sponge" receivers 801 are sent over LAN 808 via a network interface 803 to the software module 804. The software module 804 pre-selects and sorts the datagrams by their headings, discarding the previously received datagrams. Video fragments are stacked in the video frame collection (defragmentation) queue 805, while audio fragments are stacked in the audio queue 807. The video queue 805 and audio queue 807 have sufficient length to accumulate data over the declared latency time (less than 1 sec, preferably less than 0.5 sec). Datagrams with control data, including responses to requests directed at the wearable devices 101-111, are sent to the decision-maker unit 806, which controls the states of the modules 805 and 807.

In case there is missing data, the decision-maker unit 806 may send control signals to the wearable devices 101-111 requesting to repeat a fragment, to send an extraordinary key/Iframe, or to modify encoding parameters. The control signals are sent via the network interface 803, LAN 808 and finally via "central" access points 802 to the wearable devices 101-111. The data from the frame collection queue 805 and audio collection queue 807 that have been successfully collected, are synchronized using audio data timestamps and then sent via the TCP/UDP transport protocol to the users 810, e.g., hardware display units, CDN servers, etc. The audio packet queue module 807 may receive audio input from a specified user (show farm, control laptop/tablet) to be broadcast to the wearable devices 101-111 as datagrams in order to communicate with the wearer 709. The Internet/WAN module 809 is used for direct Internet connection to receive additional instructions from the license server 136. The main server 131 is capable of storing the audio and video streams received from the wearable devices 101-111 on an internal storage device for further use.

Figure 14A:
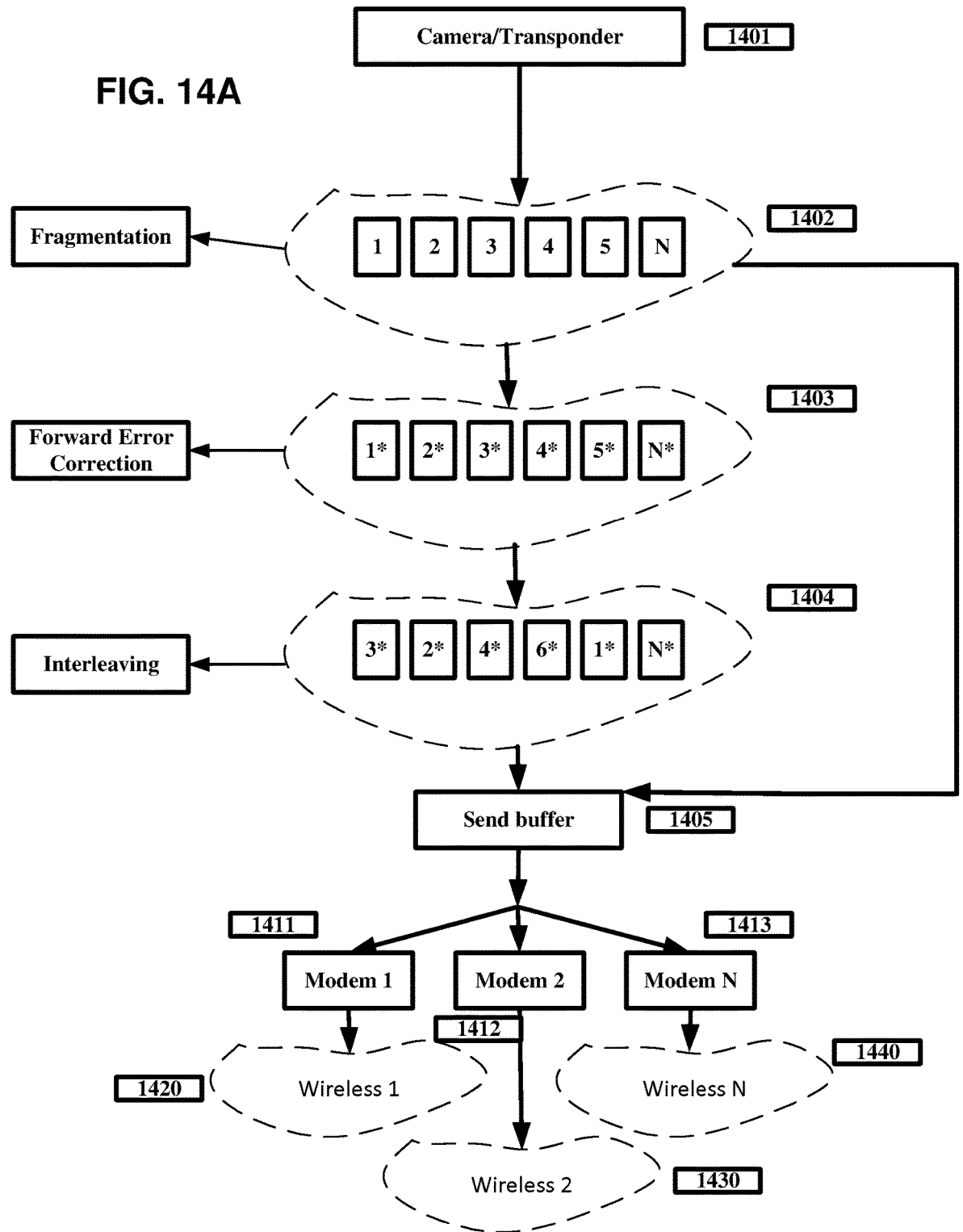
FIG. 14A illustrates a clarifying scheme for generating an audio-video stream and transmitting it via several wireless network interfaces.
Figure 14B:
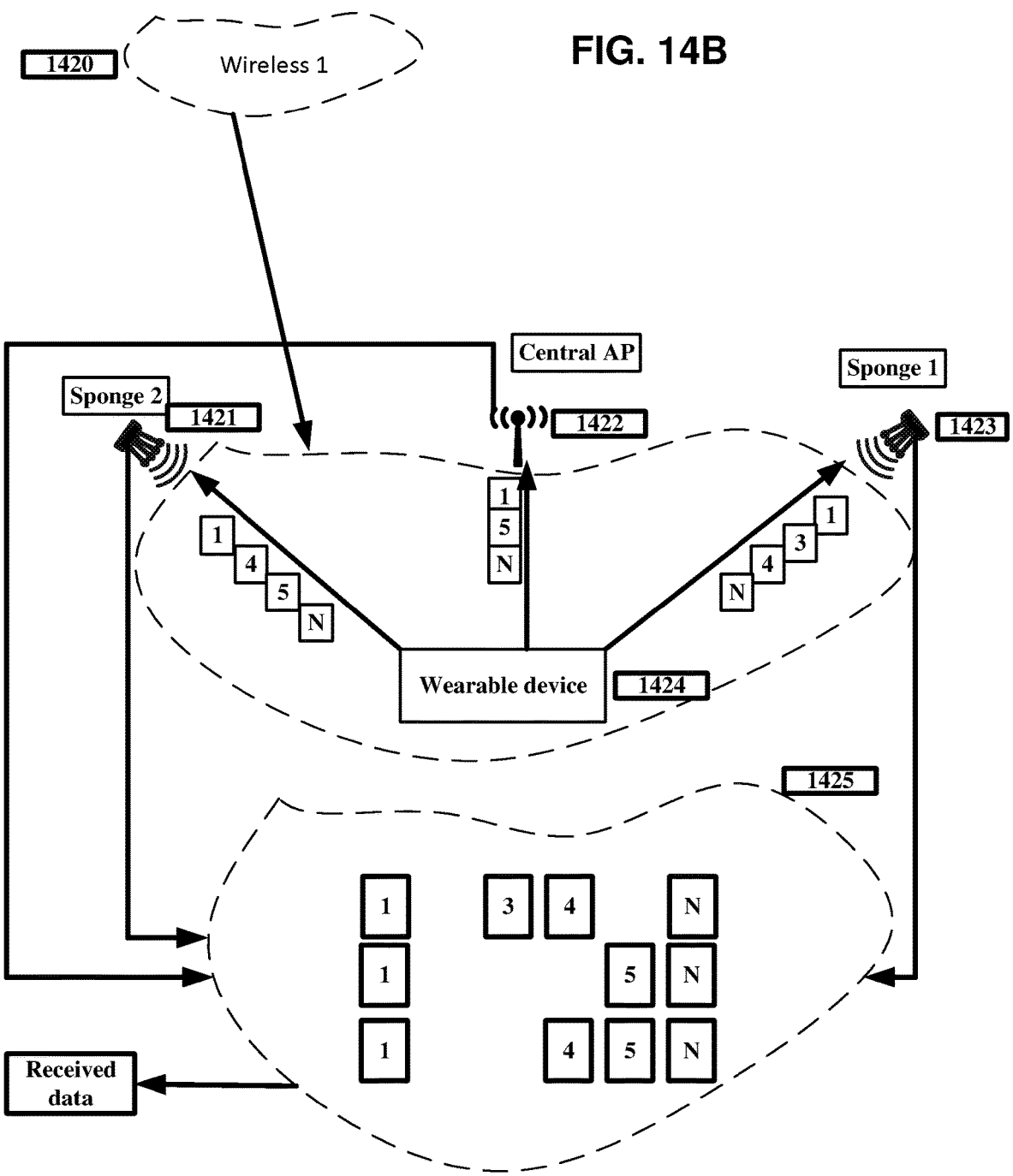
FIG. 14B illustrates a scheme of the distributed data assembly inside the first wireless network, which is deployed around the work area, sent from the wearable device via the first network interface (see FIG. 14A).
Figure 14C:
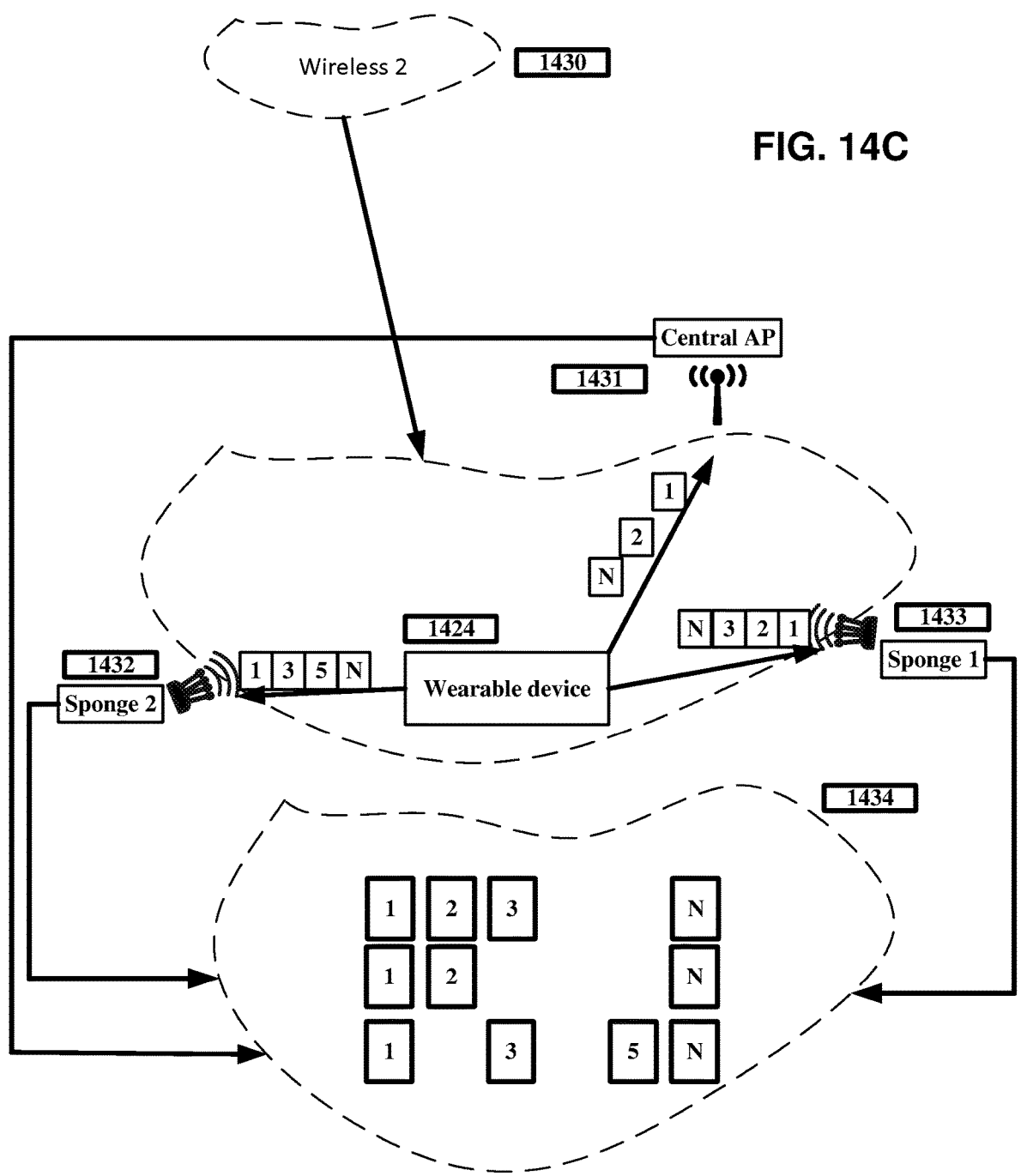
FIG. 14C illustrates a scheme of the distributed data assembly inside the second wireless network, which is deployed around the work area, sent from the wearable device via the second network interface (see FIG. 14A).
Figure 14D:
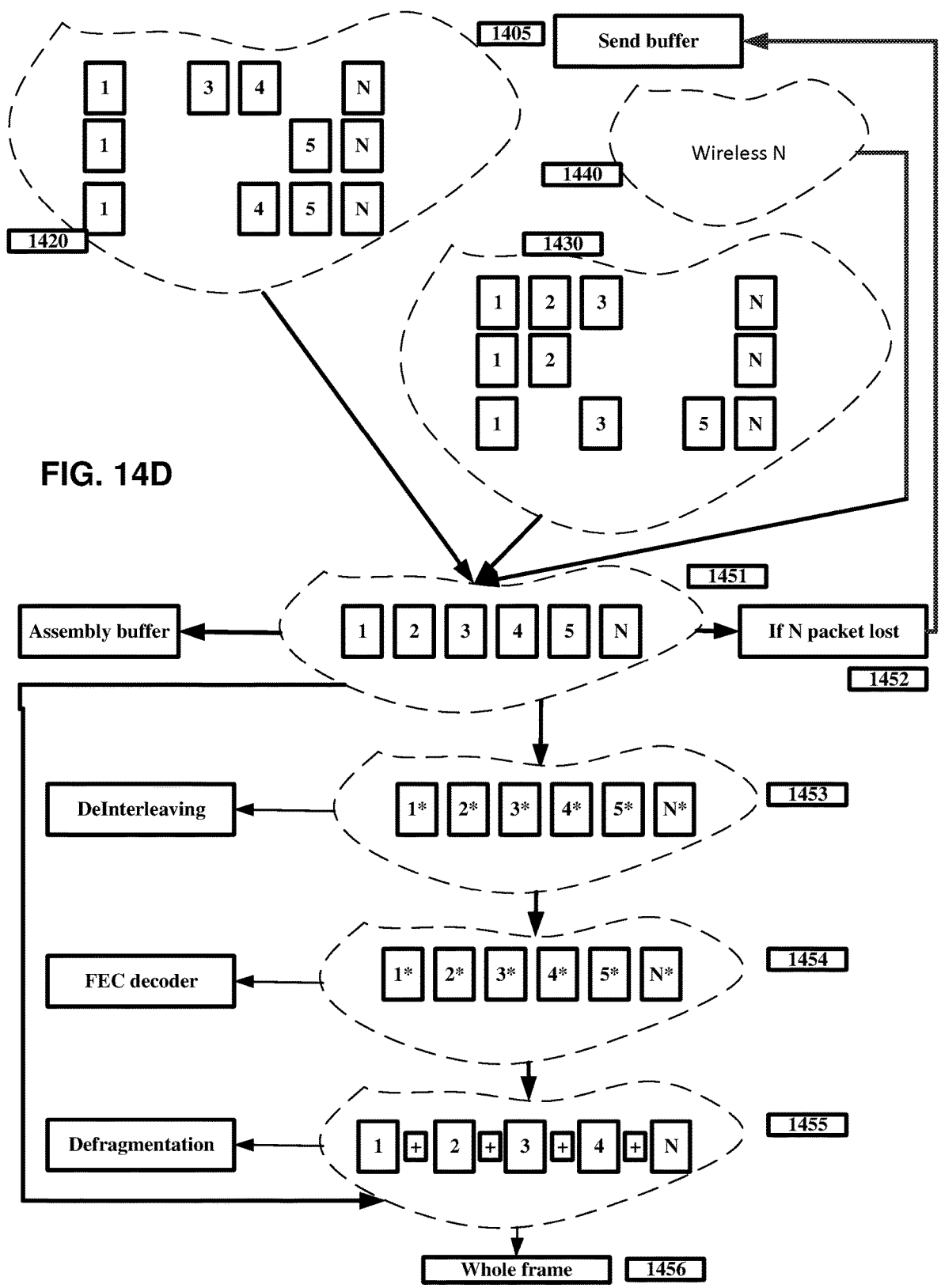
FIG. 14D illustrates a scheme of the final data assembly transmitted through several network interfaces and received by several radio networks (see FIGS. 14A, 14B, 14C).

FIGS. 14A-14D, which should be viewed as a single figure, illustrate a scheme for broadcasting audio and video data that involves generation, transmission and assembly of the resulting feed. FIG. 14A illustrates a clarifying scheme for generating an audio-video stream and transmitting it via several wireless network interfaces. FIG. 14B illustrates a scheme of the distributed data assembly inside the first wireless network, which is deployed around the work area, sent from the wearable device via the first network interface (see FIG. 14A). FIG. 14C illustrates a scheme of the distributed data assembly inside the second wireless network, which is deployed around the work area, sent from the wearable device via the second network interface (see FIG. 14A). FIG. 14D illustrates a scheme of the final data assembly transmitted through several network interfaces and received by several radio networks (see FIGS. 14A, 14B, 14C).

A camera with built-in modems or a transponder connected to the camera 1401 generates a compressed frame using conventional frame compression algorithms, such as h.264/h.265/Other codec, or audio (AC3/FLAC/Other). The feed generation algorithm is illustrated in detail in FIG. 7. The resulting frame is sent to the input of the video fragmentation unit 1402, its size ranging from 50 to 65,000 bytes, depending on the wireless technology employed. Usually, the packet size (including the header) is set to 1,500 bytes, which corresponds to typical MTU of the Ethernet network.

Then, the fragments are sent to the sending buffer 1405 that has a fixed size, large enough to meet the maximum claimed latency in each specific situation, depending on how fast the wearable devices are moving through the work area (up to 0.5 sec). Between the sending buffer 1405 and video fragmentation unit 1402, there may be an intermediary Forward Error Correction module 1403 (FEC) and interleaving buffer 1404. The FEC module 1403 is used only in case the radio network used to transmit data does not have its own FEC.

The interleaving buffer 1404 size is set to be equal to or less than the established network delay (up to t=1/FPS, sec). For example, at 50 FPS reception of a single frame takes 20 msec, and data transfer delay may be set to 10 msec, so the interleaving buffer size will be 10 msec or less. From the sending buffer 1405, the data are transmitted via modems/channels (using several radio access technologies) to the assembly buffer 1451 of the main server. The data may be sent in different ways, depending on the instructions from the main server, i.e., by establishing parallel data transfer channels via multiple modems/channels. In case three modems are used, the data load may be distributed between them, e.g. two modems may be used to deal with audio and video data and control, while the third modem may be used to send repeats and key frames of the encoded video (esp. reference frames used in modern codecs, such as h.264, h.265, etc.).

Data are transmitted via modems/channels 1411-1413 to the assembly buffer 1451 of the main server. Each modem/channel is associated with an individual radio network 1420, 1430, or 1440. The data transmitted via these modems/channels is collected by base stations of various types that surround the work area. As noted above, the system may be either closed (i.e., it uses its own WI-FI-based base stations and "sponge" receivers only, or a wireless system deployed at the arena, with extra "sponge" receivers for additional data collection) or open (i.e. it uses its own WI-FI-based wireless system, with "sponge" receivers, and an additional LTE/3G radio system, or a different radio system that is provided by a provider or rented from a provider for the purposes of the event).

By using two or more modems, it is possible to maintain coordinated multi-network data transmission, i.e., multipoint communication between wearable devices and the data receiving server, in order to establish multiple parallel/aggregate communications channels, to maintain continuous operation in case there are errors in either channel, and to allow distribute data reception. When data is transmitted over two communications channels, some data that may be lost in one channel, will be picked up by the other channel.

Another important aspect involves distributed data reception within a single radio network, wherein the data transmitted over a modem (one of the radio access technologies employed) will be received by one or several "central" access points, as well as by additional access points ("sponge" receivers), which would allow to establish several concurrent and identical data streams. In case some data are lost in either stream, they will be received via a different stream by an additional access point ("sponge" receiver), which forms the basis for coordinated data transmission/reception. By using these two technologies (coordinated multi-network data transmission and coordinated multipoint reception), it is possible to maintain stable and quality transmission of data/content with minimum latency and fewer errors, as these technologies help to offset losses.

FIGS. 14A-14B thus illustrate an exemplary embodiment, in which data are transmitted via two on-site WI-FI-based radio networks (coordinated multi-network data transmission) 1420 and 1430 to be received by base stations of various types within these two networks (coordinated multipoint reception). The wireless network 1420 comprises a "central" access point 1422 and two additional "sponge" receivers 1421 and 1423. The "central" access point 1422 is unable to receive the entire data stream without increasing latency by recovering data that have been lost due to the wearable device 1424 being moved around the work area, blockage by other objects, or radio shadows. Therefore, "sponge" receivers are used to additionally receive the data streams from the wearable device 1424 to forward them to the assembly buffer 1451.

For example, the "central" access point 1422 has received only packets 1 and 5, while additional "sponge" receivers 1421 and 1423 have received packets 1, 3, 4, and 5; all the received data have been then sent to the assembly buffer 1451. The second radio network 1430 is also deployed around the work area, but its access points 1431-1433 are located at some distance from the access points of the first radio network 1420, so as to be able to receive the data that may have been slipped through the first radio network.

The second radio network 1430 has received packets 1, 2, 3, and 5 through its "central" access point and additional access points; the packets have been then forwarded to the assembly buffer 1451 as well. Thus, the assembly buffer 1451 (FIG. 14D) may receive unique data that have slipped through all networks or receivers but one due to interference, movement, or other transmission issues, as well as several copies of the same data (packets). The resulting data stream is defragged 1455 and then undergoes reverse processing in the FEC module 1454 and interleaving buffer 1453, if there are any. The waiting time for receiving a packet from the network is equal to or less than the established delay (up to 0.5 sec).

In case packet reception fails, it is recovered 1452 from the sending buffer 1405. According to this algorithm, lost packets are put forward in the sending queue of the sending buffer 1405 to be sent first. After a packet has been forwarded from the sending buffer 1405 to the radio network, it is not immediately deleted from the queue. It is deleted after a time period that is equal to the established delay has passed, or after the server's assembly buffer 1451 confirms its reception. The data processing algorithm employed by the server is illustrated in FIG. 8.

The solution for transmitting and receiving data with the help of coordinated multi-network data transmission and distributed sending/receiving of data as disclosed herein uses UDP protocol, which enables fastest transmission of data from the source to the endpoint, without waiting for confirmation that the data have been received. By using an on-site WI-FI-based radio network with disabled packet reception notifications, it is possible to further reduce transmission delays. The packet recovery algorithm has been described above, but if FEC modules and interleaving buffers are used, the need for recovery is reduced. In case some data is lost, it is possible to request a repeat sending of the lost datagram only, not the entire frame, because packets are fragmented into chunks that correspond to a standard Ethernet packet.

Figure 13A:
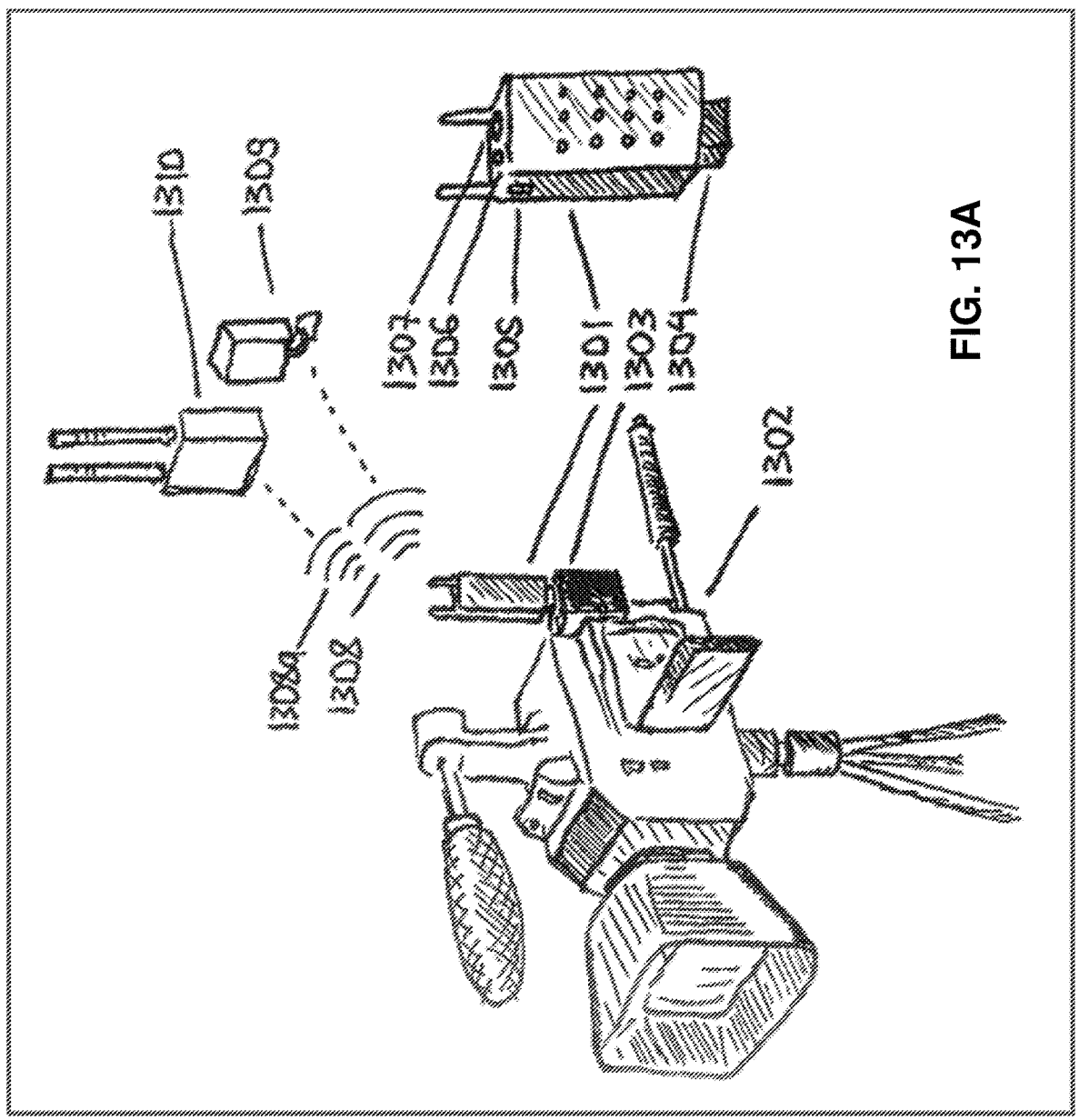
FIG. 13A illustrates a method for connecting stationary filming equipment with a detachable transponder that uses two radio access technologies (WI-FI and LTE) and two modems.

One of the aspects of this disclosure is using a wireless transponder to connect stationary filming equipment with the network to enable audio and video transmission to the server. FIG. 13A illustrates an exemplary embodiment of the wireless transponder. The transponder 1301 is connected to a TV camera mounted on a stationary stand 1302 via the transponder's network connector 1304 that corresponds the camera's built-in network interface 1303. The transponder's case includes a socket for the built-in microUSB charge module 1305, an LED indicator 1306, and an on/off switch 1307. Inside the transponder, there are two or more modems that enable simultaneous connection to the corresponding number of wireless channels 1308, 1308*a*. While there are only two connections shown in FIG. 13A, there may be three or more of them, depending on the specifics of the location and the task. The detachable transponder 1301 is able to transmit audio and video content over two or more wireless channels to the server by accessing a base station 1310 or a "sponge" receiver 1309.

Figure 13B:
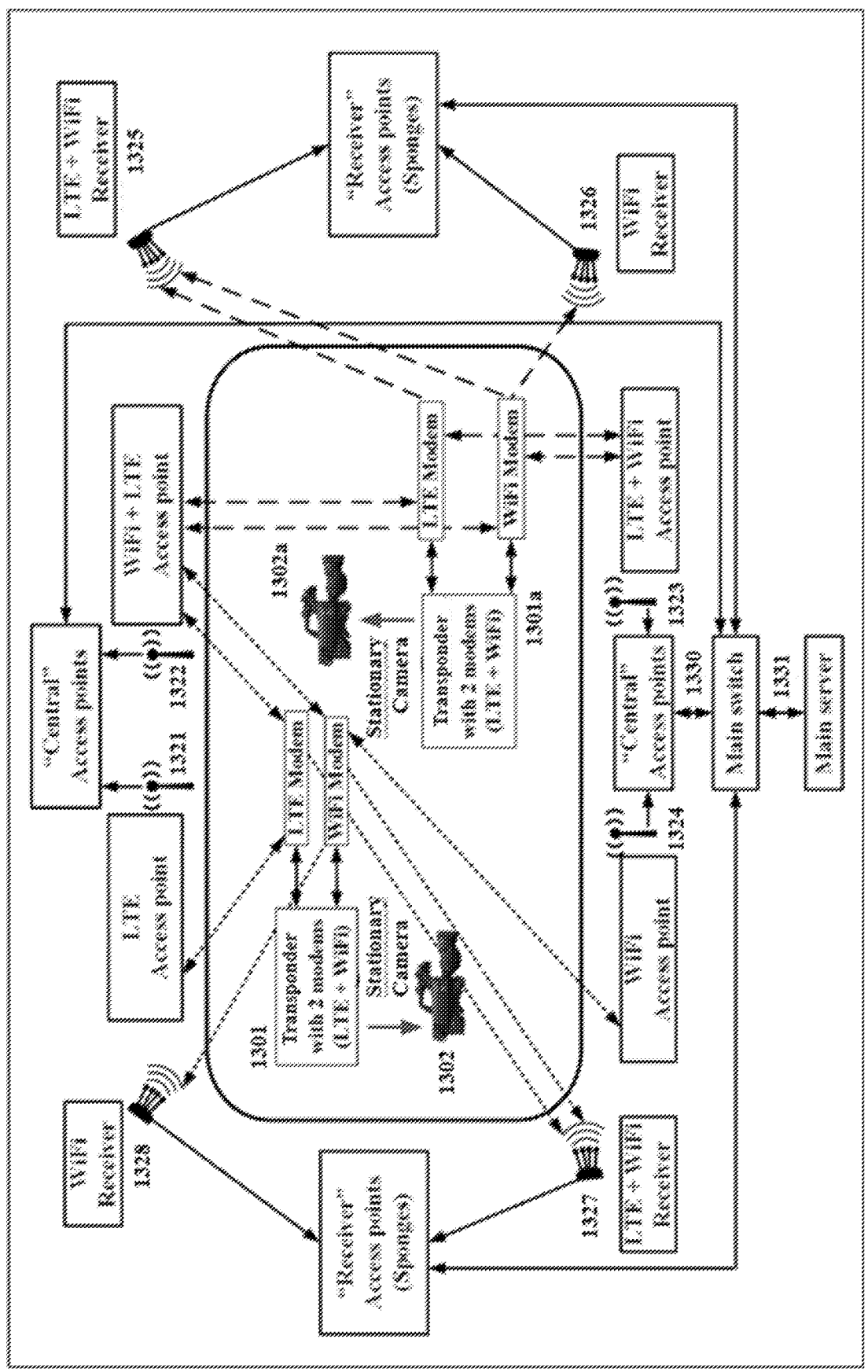
FIG. 13B illustrates an exemplary scheme of data exchange between stationary filming equipment that is connected via a transponder and base stations, using two radio access technologies (WI-FI and LTE) and two modems, which are installed into the transponder connected to the filming equipment.

FIG. 13B illustrates an exemplary deployment of the claimed system using stationary filming equipment and detachable wireless transponders equipped with two radio access technologies (WI-FI+LTE), which are used simultaneously/in parallel. According to this deployment, the transponder 1301 is equipped with two modems—a WI-FI modem and an LTE modem, however, other combinations, such as WI-FI+UWB, WI-FI 2.4 GHz+WI-FI 5 GHz, WI-FI+LTE+3G, 5G+WI-FI, etc. are possible. The transponder 1301 is connected to the camera 1302, which is located in the upper part of the work area, thus being capable of establishing connection with three "central" access points 1321, 1322, and 1324, which enable data exchange with the main server 1331 in both directions (bi-directional communication). The data from the transponder 1301 may also be received by additional distributed receivers 1327 and 1328 that will forward the data to the main server 1331 for processing. Thus, the main server 1331 receives several streams of identical data from a single wearable device 1301, discards repetitions and generates a stable resulting audio and video stream. As the device is moving around, the number of data streams transmitted to the main server may reach four or more, depending on the location of the device. The transponder 1301*a* is connected to the second camera 1302*a*, which is located in a different part of the work area, thus being capable of establishing bi-directional communication with "central" access points 1322 and 1323, whereas the data from the transponder may also be received by additional access points 1325 and 1326 that will forward the data to the main server 1331 for processing. By using two parallel high-speed wireless data channels, it is possible to avoid problems faced by devices that operate at one high-speed data channel only. The problems include: unstable signal feed from a transponder to the main server (communication losses due to abrupt movement, blocking by other objects/subjects, or radio shadows); multiple repeats of lost data packets (datagrams); increased latency due to multiple repeated requests; insufficient bandwidth in case all active transponders have moved into the same part of the work area, or the number of transponders increases. Other problems may arise due to poor SNR (signal-to-noise ratio) caused by external noise or overlapping frequencies (e.g., in case the system comprising multiple transponders is deployed in an environment where there are not enough available frequencies). If several radio access technologies are used (see FIG. 13B), then break-offs in one channel will be offset by communication over another channel, i.e., the data, which have been lost when being transmitted over one channel, will be transmitted over another wireless channel. When two or more wireless channels are used in the system, it is possible to avoid problems caused by noise on the frequency used by either of the wireless channels, i.e., the data, which have been lost when being transmitted over one channel, will be transmitted over another wireless channel. When two or more modems are used in a single transponder at once, the device is capable to switch between frequencies without interrupting the audio and video streaming, by tuning one modem to a new frequency first, then another. When data reception is maintained by two types of distributed base stations (i.e., "central" and "sponge"), it is possible to avoid problems caused by losing some packets/datagrams due to the transponder being blocked by other objects/subjects, or radio shadows. In case the lost data cannot be recovered, despite all the effort to avoid this, the control data packets will reach the transponder via several "central" access points to trigger a certain instruction concerning repeated data requests or buffer reset. If a transponder uses two or more wireless channels to receive data from "central" access points, it will be able to receive two or more control data streams, correspondingly, thus making the control channel more reliable.

Another aspect of this disclosure is provision of stable audio and video signal quality (set up by the control laptop/table or license server) to be maintained over the entire period specified with minimum latency (less than 0.5 sec) from all wearable devices 101-111 or transponders connected to stationary filming equipment 1311 and 1312 inside the work area at once, regardless of their relative location. This aspect is crucial for both system users (sports leagues, teams, enterprises) and content consumers (e.g., fans of a certain player may wish to follow him/her specifically, with the same image quality as that provided for the player currently possessing the ball/hockey puck; during auto races, image quality has to be stable at all times, since it is very difficult to prioritize some race drivers over others; and in enterprises or during mass activities, quality deteriorations may affect perception of certain events, as it would be impossible to view the video/image in detail).

By using several radio access technologies at once (coordinated multi-network streaming), it becomes possible to get a more data transfer due to parallel data transfer or channel aggregation, which results in less losses and less repeated requests for lost data. Therefore, the need to have a large buffer to compensate for losses on the main server storing more than a half a second of data is eliminated. Also, because there are less losses, the need to reduce the quality of the streamed content (in some cases, content quality reduction allows to reduce the total data feed from a wearable device to the main server, thus reducing the number of errors) is eliminated as well.

By using several distributed access points of different types, it is possible to maintain communication with the wearable devices via several channels at once, using the "central" access points, and to receive data from the wearable devices via the "central" access points and "sponge" receivers despite their relative locations inside the work area. As a result, it becomes possible to maintain stable quality of video and audio streams from all active wearable devices or a transponder connected to stationary filming equipment inside the work area, since the data transmitted by the wearable devices are gathered by multiple distributed access points, both "central" and additional (receivers), and sent to the main server to be processed. When noise appears, or there is interference between the wearable device(s) and/or transponder(s) and a subject/object during data transfer, the data will still be delivered to the main server along a different path.

The main server receives at least four streams of the same data to be combined into a final audio and video stream for users, so the receiving buffer size of more than 0.5 sec is redundant, as the plurality of data feeds from a given wearable device or a transponder connected to stationary filming equipment compensates for the lost data that may have been delivered along a different path. In case the lost datagrams cannot be recovered, then reverse channels (depending on the number of "central" access points and communication type) can be used to send a control signal to a wearable device in order to invoke repeat sending of the lost data or to call an extraordinary reference frame, etc.

Since even by using distributed access points and several wireless channels at once, it is not always possible to provide minimum delay (not exceeding 0.5 sec) between generating audio and video stream by the wearable device and broadcasting the final audio and video stream to the users by the main server, in some cases it is necessary to control the sending buffer in the wearable device, as well as the encoding device for the captured video data. In case the lost video data cannot be recovered, and the latency does not exceed the set value (0.5 sec or less), these data may be sent again from the sending buffer in the wearable device. In another example, if the delay between receiving the data (camera footage) by the wearable device and generating the final audio and video streams (for users) approaches the critical value (0.5 sec) because of losses, an instruction may be sent to call an extraordinary key/Iframe (which is characteristic of modern codecs, such as h.264, h.265, etc., or proprietary codecs), and the sending buffer in the wearable device will be reset to the key/I frame just received.

In some cases, the sending buffer in the wearable device may already contain a new key/I frame. If this frame's timestamp meets the requirements of the declared latency, then it won't be necessary to reset (clear) the sending buffer completely; it will be enough to reset the buffer partially, to this new key/I frame. In order to reduce interference from other devices inside the work area (fans with cell phones, workers, people, other radio devices) that may cause losses and increase latency, the standard band segmentation used in WI-FI, i.e., 20/40/60 etc. MHz-wide bands, may be inapplicable in the conditions of a mass gathering of people because of noise and access point overloading with "outside" data. Therefore, standard bands may be shifted by several MHz, e.g., 5120 MHz->5130 MHz; 5180 MHz->5185 MHz.

Also, encoded standard WI-FI (beacon, probe request and others) packets can be used (beacon, probe request, probe response, authentication, deauthentication) in order to protect access points and reduce their load caused by "outside" data from multiple devices located within the work area or nearby. These enhancements can be used together or separately, e.g., encoded standard WI-FI packets and band shifts will make access points see relevant wearable devices only. In order to reduce the latency of data transfer from wearable devices and/or stationary filming equipment that is connected via a detachable wireless transponder to the main server, the WI-FI protocol stack may be modified, particularly, by turning off packet delivery confirmations in the WI-FI protocol core. Standard delivery confirmations within the WI-FI protocol (between access points and wearable devices) can be substituted with proprietary delivery algorithms, both with and without confirmation (between wearable devices and the main server), and WI-FI can be used only as an instrument that doesn't guarantee that the data have been delivered.

The present invention can be used in mass activities (sports events, enterprise security, social gathering security, entertainments, such as carting, paintball, cycling, polo, reality shows).

Figure 15:
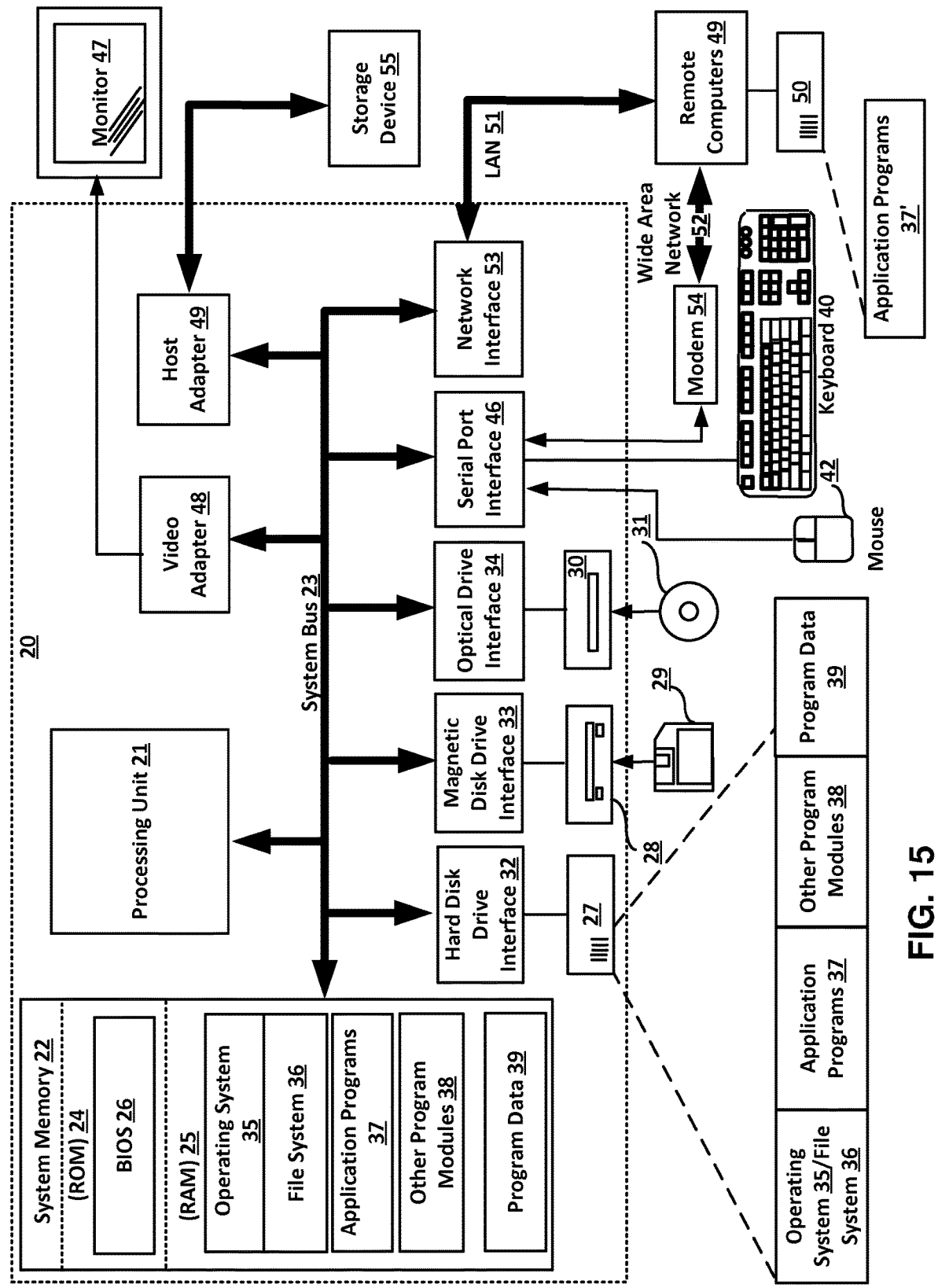
FIG. 15 illustrates an exemplary computer or server that may be used in the invention.

With reference to FIG. 15, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for streaming video content, comprising:
   establishing a first link for streaming data through a first radio network between a remote transponder and a server via a first base station, wherein the transponder includes a plurality of wireless modems and receives video data from a camera;
   establishing a second link for streaming data through a second radio network between the remote transponder and the server via a second base station;
   on the camera, generating a video stream and sending the video stream to the transponder;
   on the transponder, assigning a packet sequence number to each packet in the video stream;
   transmitting the video stream from the transponder to the server through the first link as a first stream, and through the second link as a second stream, wherein the second stream duplicates the first stream;
   on a first sponge that corresponds to the first radio network and acts as a sniffer of the first radio network, receiving radio data that represents the first stream and sending it to the server as a third stream, which duplicates the first stream;
   on a second sponge that corresponds to the second radio network and acts as a sniffer of the second radio network, receiving radio data that represents the second stream and sending it to the server as a fourth stream, which also duplicates the first stream;
   on the server, receiving the first stream through the first link and the third stream from the first sponge;
   on the server, receiving the second stream through the second link and the fourth stream from the second sponge;
   for each packet in each stream, identifying packets by their sequence number, retaining a first received packet with a particular sequence number, and discarding all remaining packets with the same sequence number; and
   combining the retained packets into a resultant video stream.

2. The method of claim 1, further comprising:
   on the camera, generating an audio stream and sending the audio stream to the transponder;
   on the transponder, assigning a packet sequence number to each packet in the audio stream;
   transmitting the audio stream from the transponder to the server through the first link as a fifth stream, and through the second link as a sixth stream, wherein the sixth stream duplicates the fifth stream;
   on the first sponge, receiving radio data that represents the fifth stream and sending it to the server as a seventh stream;
   on the second sponge, receiving radio data that represents the sixth stream and sending it to the server as an eighth stream;
   on the server, receiving the fifth stream through the first link and the seventh stream from the first sponge;
   on the server, receiving the sixth stream through the second link and the eighth stream from the second sponge;
   for each packet in each stream, identifying packets by their sequence number, retaining a first received packet with a particular sequence number, and discarding all remaining packets with the same sequence number; and
   combining the retained packets of the audio stream into a resultant audio stream and combining the resultant audio stream with the resultant video stream.

3. The method of claim 2, wherein the transponder assigns timestamps to the audio and video packets, and wherein the server synchronizes the resultant audio stream and the resultant video stream using the timestamps.

4. The method of claim 3, wherein the server transmits the resultant video stream to end users.

5. The method of claim 2, wherein the sponge scans a radio environment and informs the server about which channels are available for transmission of the video stream and the audio stream.

6. The method of claim 1, wherein the first radio network is any of UWB, 3G mobile telephone network, LTE mobile telephone network, 5G mobile telephone network and WI-FI network.

7. The method of claim 2, wherein the server receives video and audio streams from multiple cameras, wherein each camera has its own transponder, and wherein all transponders use the first and second radio networks.

8. The method of claim 1, wherein the second radio network is a WI-FI network.

9. The method of claim 8, wherein the WI-FI network is modified to (a) block confirmation of receipt of the packets, and/or (b) to operate on non-standard bands so as to only see its own cameras/transponders.

10. The method of claim 1, wherein the server stabilizes the resultant video stream to remove shaking artefacts.

11. The method of claim 1, wherein the first link includes a first modem that is associated with the first base station, the second link includes a second modem that is associated with the second base station.

12. The method of claim 1, wherein the sponge is a physical device that monitors traffic to the first and second base stations.

13. The method of claim 1, wherein the transponder is a physical device.

14. The method of claim 1, wherein the transponder is a virtual device.

15. The method of claim 1, further comprising:
   on the server, when any packet is lost, sending a request from the server to the transponder through the first radio network via the first base station and sending the same request through the second radio network via the second base station to retrieve the lost packet;

on the transponder, upon receiving the request, searching a sending buffer queue for the lost packet by its sequence number;

on the transponder, if the lost packet is found in the sending buffer queue, transferring the found packet to a position in a sending buffer queue to be sent before any other packet in the sending buffer queue;

on the server, if the lost packet is received, moving the packet to a position in a receiving buffer queue between a packet with a preceding sequence number and a packet with a succeeding sequence number;

on the server, if the lost packet is not received but is still within a latency defined by the server, sending another request to the transponder to retrieve the lost packet;

on the server, if the lost packet is not received and the latency has been exceeded, searching the receiving buffer queue for packets marked as keyframe-related packets;

on the server, if any keyframe-related packets are detected in the receiving buffer and the lost packet is not a keyframe-related packet, removing all packets from the beginning of the receiving buffer queue to a first keyframe-related packet, excluding the first keyframe-related packet, wherein a first keyframe-related packet is one closest to a beginning of the receiving buffer queue;

on the server, if no keyframe-related packets detected in the receiving buffer or if the lost packet is a keyframe-related packet, removing all packets in the receiving buffer queue and sending a keyframe generation request to the transponder; and wherein all packets received by the server after the keyframe generation request is sent which are not a first packet of a keyframe are dropped before the first packet of the keyframe is received.

16. The method of claim 15, further comprising:

on the transponder, when the keyframe generation request from the server is received, searching the sending buffer queue for a first keyframe-related packet, wherein the first keyframe-related packet is one closest to a beginning of the sending buffer queue;

on the transponder, if the first keyframe-related packet is detected in the sending buffer and is within the latency, removing all packets from the beginning of the sending buffer queue to the first keyframe-related packet, excluding the first keyframe-related packet;

on the transponder, if the first keyframe-related packet is not detected in the sending buffer queue or the latency is exceeded, searching an encoding buffer queue for a keyframe which is within the latency, and wherein if there are more than one qualified keyframe, the first keyframe is used, and wherein the first keyframe is one closest to a beginning of the encoding buffer queue;

on the transponder, if the keyframe is found in the encoding buffer queue, removing all frames between the keyframe and the beginning of the encoding buffer queue; and on the transponder, if the keyframe is not found in the encoding buffer queue, removing all frames in the encoding buffer queue, and generating a new keyframe.

* * * * *

UNITED STATES PATENT AND TRADEMARK OFFICE
CERTIFICATE OF CORRECTION

PATENT NO. : 11,146,612 B1  
APPLICATION NO. : 17/026210  
DATED : October 12, 2021  
INVENTOR(S) : Alexander Pestryaev et al.

Page 1 of 1

It is certified that error appears in the above-identified patent and that said Letters Patent is hereby corrected as shown below:

On the Title Page

Item (72), the second inventor's last name should read as "Bussel".

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*